(12) United States Patent
Enzinger et al.

(10) Patent No.: US 11,423,926 B2
(45) Date of Patent: Aug. 23, 2022

(54) REAL-TIME VOICE PHISHING DETECTION

(71) Applicant: Eduworks Corporation, Corvallis, OR (US)

(72) Inventors: Ewald Enzinger, Neulengbach (AT); Robert O. Robson, Corvallis, OR (US)

(73) Assignee: Eduworks Corporation, Corvallis, OR (US)

( * ) Notice: Subject to any disclaimer, the term of this patent is extended or adjusted under 35 U.S.C. 154(b) by 0 days.

(21) Appl. No.: 16/950,667

(22) Filed: Nov. 17, 2020

(65) Prior Publication Data

US 2021/0193174 A1 Jun. 24, 2021

Related U.S. Application Data

(60) Provisional application No. 62/951,540, filed on Dec. 20, 2019.

(51) Int. Cl.
| | |
|---|---|
| *G10L 25/69* | (2013.01) |
| *G10L 17/02* | (2013.01) |
| *G10L 17/06* | (2013.01) |
| *G10L 17/18* | (2013.01) |
| *G10L 25/24* | (2013.01) |
| *G10L 25/30* | (2013.01) |

(Continued)

(52) U.S. Cl.
CPC .............. *G10L 25/69* (2013.01); *G10L 17/02* (2013.01); *G10L 17/06* (2013.01); *G10L 17/18* (2013.01); *G10L 25/24* (2013.01); *G10L 25/30* (2013.01); *H04M 3/2281* (2013.01); *H04M 3/5183* (2013.01); *H04M 2201/41* (2013.01)

(58) Field of Classification Search
None
See application file for complete search history.

(56) References Cited

U.S. PATENT DOCUMENTS 10,657,971 B1 * 5/2020 Newstadt ................ G10L 15/26
11,158,307 B1 * 10/2021 Ghias ...................... G10L 15/04
(Continued)

OTHER PUBLICATIONS

Bhat, Chitralekha, et al. "Dysarthric Speech Recognition Using Time-delay Neural Network Based Denoising Autoencoder." INTERSPEECH. 2018. (Year: 2018).*

(Continued)

*Primary Examiner* — Douglas Godbold
(74) *Attorney, Agent, or Firm* — Klarquist Sparkman, LLP

(57) ABSTRACT

Methods and systems are disclosed for detecting threats in voice communications such as telephone calls. Various voice phishing (vishing) detectors detect respective type of threats and can be used or activated individually or in various combinations. A tampering detector utilizes deep scattering spectra and shifted delta cepstra features to detect tampering in the form of voice conversion, speech synthesis, or splicing. A content detector predicts a likelihood that word patterns on an incoming voice signal are indicative of a vishing threat. A spoofing detector authenticates or repudiates a purported speaker based on comparison of voice profiles. The vishing detectors can be provided as an authentication service or embedded in communication equipment. Machine learning and signal processing aspects are disclosed, along with applications to mobile telephony and call centers.

35 Claims, 16 Drawing Sheets

(51) Int. Cl.
    H04M 3/22    (2006.01)
    H04M 3/51    (2006.01)

(56) References Cited

U.S. PATENT DOCUMENTS

| | | | |
|---|---|---|---|
| 2015/0317990 A1* | 11/2015 | Fousek | G10L 19/26 704/500 |
| 2016/0104485 A1* | 4/2016 | Allen | G10L 25/51 704/9 |
| 2018/0254046 A1* | 9/2018 | Khoury | G10L 17/00 |
| 2019/0020682 A1* | 1/2019 | Edwards | H04L 51/22 |
| 2019/0141183 A1* | 5/2019 | Chandrasekaran | H04M 3/42059 |
| 2019/0156034 A1* | 5/2019 | Kedem | G06Q 20/108 |
| 2021/0125603 A1* | 4/2021 | Liang | G10L 17/18 |

OTHER PUBLICATIONS

Seltzer, Michael L., Dong Yu, and Yongqiang Wang. "An investigation of deep neural networks for noise robust speech recognition." 2013 IEEE international conference on acoustics, speech and signal processing. IEEE, 2013. (Year: 2013).*

Fousek, Petr, Pierre Dognin, and Vaibhava Goel. "Evaluating deep scattering spectra with deep neural networks on large scale spontaneous speech task." 2015 IEEE International Conference on Acoustics, Speech and Signal Processing (ICASSP). IEEE, 2015. (Year: 2015).*

Sriskandaraja, Kaavya, et al. "Front-end for antispoofing countermeasures in speaker verification: Scattering spectral decomposition." IEEE Journal of Selected Topics in Signal Processing 11.4 (2016): 632-643. (Year: 2016).*

International Search Report and Written Opinion, PCT Application No. PCT/US2020/060913, dated Feb. 4, 2021, 14 pages.

Alimohad et al., "Efficient Invariant Features for Sensor Variability Compensation in Speaker Recognition", Sensors, vol. 14, No. 10, pp. 19007-19022 (Oct. 2014).

Andén et al., "Deep Scattering Spectrum", IEEE Transactions on Signal Processing, vol. 62, No. 16, pp. 4114-4128 (Aug. 2014).

Brümmer et al., "The speaker partitioning problem", Odyssey 2010: The Speaker and Language Recognition Workshop, pp. 194-201 (Jun. 2010).

Bruna et al., "Invariant Scattering Convolution Networks", IEEE Transactions on Pattern Analysis and Machine Intelligence, vol. 35, No. 8, pp. 1872-1886 (Aug. 2013).

Dehak et al., "Front-End Factor Analysis for Speaker Verification", IEEE Transactions on Audio, Speech, and Language Processing, vol. 19, No. 4, pp. 788-798 (May 2011).

Hanilçi et al., "Classifiers for Synthetic Speech Detection: A Comparison", Proc. Interspeech 2015, pp. 2057-2061 (Sep. 2015).

Kenny et al., "Eigenvoice modeling with sparse training data", IEEE Transactions on Speech and Audio Processing, vol. 13, No. 3, pp. 345-354 (May 2005).

Kohler et al., "Language Identification Using Shifted Delta Cepstra", The 2002 45th Midwest Symposium on Circuits and Systems, pp. III-69-III-72 (Aug. 2002).

Lei et al., "A novel scheme for speaker recognition using a phonetically-aware deep neural network", 2014 IEEE International Conference on Acoustic, Speech and Signal Processing, pp. 1695-1699 (May 2014).

Mohri et al., "Weighted Finite-State Transducers in Speech Recognition", pp. 1-26, also published as Mohri et al., "Weighted Finite-State Transducers in Speech Recognition", Computer Speech & Language, vol. 16, No. 1, pp. 69-88 (Jan. 2002).

Morrison et al., "Forensic Speech Science", Expert Evidence, Ch. 99, pp. 1-140, available from http://expert-evidence.forensic-voice-comparison.net/doc/Morrison,%20Enzinger,%20Zhang%20(2018)%20Forensic%20speech%20science%20(Expert%20Evidence%2099)%20-%202017-12-19a%20-%20authors'%20version.pdf (Dec. 2017).

Peddinti et al., "A time delay neural network architecture for efficient modeling of long temporal contexts", Proc. Interspeech 2015, pp. 3214-3218 (Sep. 2015).

Povey et al., "The Kaldi Speech Recognition Toolkit", 4 pages, also published as Povey et al., "The Kaldi Speech Recognition Toolkit", 2011 IEEE Workshop on Automatic Speech Recognition and Understanding, IEEE Signal Processing Society (Dec. 2011).

Povey et al., "Purely sequence-trained neural networks for ASR based on lattice-free MMI", Proc. Interspeech 2016, pp. 2751-2755 (Sep. 2016).

Povey et al., "Semi-Orthogonal Low-Rank Matrix Factorization for Deep Neural Networks", Proc. Interspeech 2018, pp. 3743-3747 (Sep. 2018).

Prince et al., "Probabilistic Linear Discriminant Analysis for Inferences About Identity", 2007 IEEE 11th International Conference on Computer Vision, pp. 1-8 (Oct. 2007).

Snyder et al., "Time delay deep neural network-based universal background models for speaker recognition", 2015 IEEE Workshop on Automatic Speech Recognition and Understanding, pp. 92-97 (Dec. 2015).

Snyder et al., "Deep Neural Network Embeddings for Text-Independent Speaker Verification", Proc. Interspeech 2017, pp. 999-1003 (Aug. 2017).

Sriskandaraja et al., "Front-End for Antispoofing Countermeasures in Speaker Verification: Scattering Spectral Decomposition", IEEE Journal of Selected Topics in Signal Processing, vol. 11, No. 4, pp. 632-643 (Jun. 2017).

\* cited by examiner

REAL-TIME VOICE PHISHING DETECTION

CROSS REFERENCE TO RELATED APPLICATION

This application claims the benefit of U.S. Provisional Application No. 62/951,540, entitled "DEVELOPING TECHNIQUES FOR DETECTING VOICE PHISHING IN REAL TIME," filed Dec. 20, 2019, which is incorporated by reference herein in its entirety.

FIELD

This application pertains to the fields of speech processing and security.

BACKGROUND

Although telephony has been widely used for over a hundred years, ubiquitous mobile phones have led to a resurgence of voice communication. Telephony today is faced with modern threats, using such technologies as voice synthesis or voice conversion for tampering or impersonation, and employing sophisticated targeting of both individuals and specific items of sensitive information. In particular, telephony can be used as a channel for socially engineered threats, to obtain sensitive information that can be further abused for fraudulent purposes over other channels of communication. Inasmuch as security technologies designed for email and electronic documents are unsuitable for detecting or protecting against threats over voice telephony, there remains a need for improved technologies to detect and warn against voice telephony threats.

SUMMARY

In summary, the detailed description is directed to various innovative technologies for detecting voice phishing ("vishing"). Some examples of the disclosed technologies provide detection of tampering, suspicious content, or spoofing in an incoming voice signal, in varying combinations, with alerts. The disclosed technologies can support mobile users, call centers, and other application scenarios. The disclosed technologies can be loaded onto a communication appliance, or can be offered as a remote service.

In certain examples, the disclosed technology can be implemented as a computer-implemented method of notifying a user of a vishing threat in an incoming voice signal received by the user. The incoming voice signal is monitored. A measure of likelihood, that the incoming voice signal has been tampered with, is determined by evaluating deep scattering spectra (DSS) features and shifted delta cepstra (SDC) features of the incoming voice signal. Based at least partly on the measure of likelihood, a real-time notification is issued to the user indicating that the incoming voice signal is the vishing threat.

In some examples, the method can be performed on one or more servers as part of an authentication service. The authentication service can be configured to receive the incoming voice signal and can transmit the real-time notification to the user. The measure of likelihood can be a first measure of likelihood, and the method can additionally include determining a second measure of likelihood that one or more detected words in the incoming voice signal are indicative of the vishing threat. Issue of the real-time notification can be further based at least partly on the second measure of likelihood. The method can also include determining a third measure of likelihood that the incoming voice signal is not by a given person, based on comparison of voice profiles of the incoming voice signal and one or more stored voice profiles of the given person. Issue of the real-time notification can be further based at least partly on the third measure of likelihood.

In additional examples, the DSS features can enable detection of voice conversion or speech synthesis, and the SDC features can enable detection of splicing. The evaluating of DSS features can include wavelet analysis of the incoming voice signal, and the evaluating of SDC features can include mel frequency analysis of the incoming voice signal. The wavelet analysis can include inputting the incoming voice signal to a multi-octave first level wavelet filter bank to obtain first level scattering components; inputting the first level scattering components to a multi-octave second level wavelet filter bank to obtain second level scattering components; and determining the DSS features from the first and second level scattering components. The mel frequency analysis can include calculating mel frequency cepstral coefficients (MFCC) of the incoming voice signal for a succession of time windows; and determining the SDC features from differences of MFCCs between respective pairs of the time windows. The evaluating of DSS features and SDC features can include constructing a feature vector based on the DSS features and the SDC features; determining a first posterior probability of tampering from a first Gaussian mixture model (GMM) trained on first training data derived from tampered voice signals; determining a second posterior probability of non-tampering from a second Gaussian mixture model (GMM) trained on second training data derived from non-tampered voice signals; and determining the measure of likelihood based on a ratio of the first and second posterior probabilities.

In certain examples, the disclosed technologies can be implemented as computer-readable media storing instructions which, when executed by one or more hardware processors, cause the one or more hardware processors to perform the following operations at training time. A training dataset is obtained, containing first word patterns from recorded vishing communications and second word patterns from recorded legitimate communications. A machine learning classifier is trained on the training dataset. Then, at run time, a most likely sequence of words is extracted from an incoming voice signal. The most likely sequence of words is inputted to the trained machine learning classifier to determine a measure of likelihood that the most likely sequence of words is indicative of a vishing threat. Based at least partly on the measure of likelihood, a real-time notification is issued or transmitted to a receiver of the incoming voice signal, advising that the incoming voice signal is indicative of the vishing threat.

In some examples, the machine learning classifier can be a naïve Bayes classifier comprising conditional probabilities, determined during the training for respective word sequences, that the incoming voice signal is associated with vishing. The extracting can include inputting the incoming voice signal to a neural network to obtain senone posterior probabilities; and inputting the senone posterior probabilities to a speech decoder to determine the most likely sequence of words. The neural network can be a time-delay neural network (TDNN) implementing a hybrid acoustic model incorporating a deep neural network (DNN) and a hidden Markov model (HMM). The speech decoder can incorporate a weighted finite state transducer (WFST) and can generate a lattice of alternative word sequences including a path that is the most likely sequence of words. The real-time notification can be issued responsive to a determination that the measure of likelihood exceeds a threshold.

In certain examples, the disclosed technologies can be implemented as a system incorporating one or more hardware processors, with coupled memory coupled and and one or more network interfaces, and computer-readable media storing executable instructions. When executed by the hardware processor(s), the instructions implement an authentication service, and include first, second, and third instructions, as well as at least two among fourth, fifth, and sixth instructions. Upon execution, the first instructions cause the authentication service to receive voice signals being delivered to a recipient. Upon execution, the second instructions cause features of the received voice signals to be conveyed to a plurality of vishing detectors, and cause respective scores to be received from the vishing detectors. Upon execution, the third instructions cause the authentication service to transmit a real-time notification of a vishing threat based on the received scores. Upon execution, the fourth instructions implement a first vishing detector configured to analyze the received voice signals for tampering, and thereby to generate a first score. Upon execution, the fifth instructions implement a second vishing detector configured to analyze the received voice signals for content associated with vishing, and thereby to generate a second score. Upon execution, the sixth instructions implement a third vishing detector configured to compare a voice profile of the received voice signals with a stored voice profile of a purported speaker, and thereby to generate a third score. The first, second, and/or third scores are conveyed as input to the second instructions.

In some examples, the instructions can include the fourth and fifth instructions, and the received scores include the first score and the second score from the first and second vishing detectors respectively. In additional examples, the instructions can include the sixth instructions, and the purported speaker can be identified based on an identifier associated with a purported origin of the incoming voice call. In further examples, the system can also include a software application running on a telephony device of the recipient. The software application can be configured to generate and deliver an audible, visual, or haptic indication of the notification to the recipient. The indication of the notification can have varying manifestation according to a type, likelihood, or estimated severity of the vishing threat. The telephony device can be a mobile phone. The recipient can be a call center agent.

The foregoing and other objects, features, and advantages of the invention will become more apparent from the following detailed description, which proceeds with reference to the accompanying figures.

DETAILED DESCRIPTION

Introduction

Figure 1:
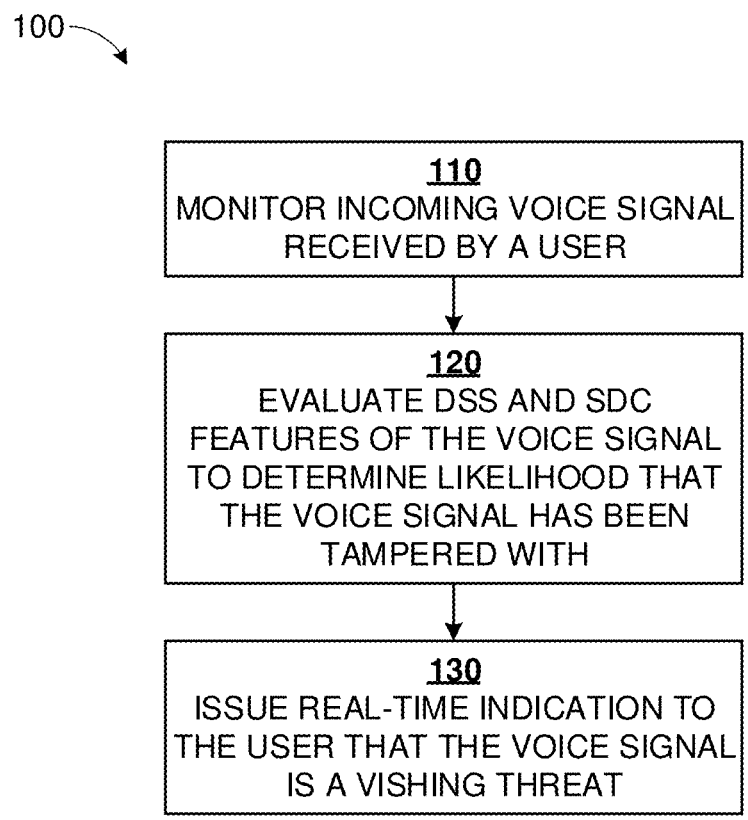
FIG. 1 is a flowchart of a first example method for detecting vishing according to the disclosed technologies.

Security is a growing concern in all areas of communication, including telephony. Examples of the disclosed technology can detect and prevent socially engineered attacks such as voice phishing. Tools for tamper detection, vishing content detection, or voice authentication can be used individually, in varying combinations, or combined with other tools. For example, a tampering detector can check whether an incoming voice signal has been altered, synthesized, reconstructed, spliced, or otherwise transformed in ways known to be used for attacks. Then, a content detector can monitor the spoken content of a call to detect indications associated with vishing calls. Further, a spoofing detector can extract a voice profile as a biometric identifier of a purported speaker, and compare the voice profile with a stored profile of the same speaker. Such detectors can work together synergistically. In some examples, the tampering detector can ensure that the spoofing detector is operating on a legitimate untampered voice signal, or the spoofing detector can authenticate a speaker so that the spoken content determined by the content detector is known to be spoken by the identified speaker, and not by an impersonator. A library of voice profiles can be maintained for trusted, authenticated speakers.

Depending on circumstances, individual detectors can be selectively enabled or disabled. For example, if a call is received ostensibly from a known, trusted individual, it can be sufficient to enable the spoofing detector to make sure that the trusted individual is not being impersonated, and enable the tampering detector to ensure that the trusted individual's speech has not been tampered with, without additionally needing to monitor content. Conversely, for an unknown caller for whom no reference voice profile exists, the spoofing detector can be disabled.

The technologies disclosed herein can close off exploitable avenues for attack and can improve security of voice telephony communications.

Terminology

The usage and meaning of all quoted terms in this section apply throughout this disclosure unless clearly indicated otherwise or repugnant to the context. The terminology below extends to related word forms.

"Authentication" refers to a process for verifying or repudiating the identity of a party in a voice communication such as a telephone call. A caller can have a purported identity based on e.g. caller ID, and a voice profile of the caller can be used to verify or repudiate the purported identity.

A "Bayes classifier" is a classifier configured to minimize the probability of mis-classification. A "naïve Bayes classifier" assumes that features input to the classifier (e.g. components of a feature vector) are independent.

A "call center" is a commercial organization with multiple agents for receiving and handling live incoming communications such as telephone calls. Commonly, a call center can be housed in a single location, but this is not a requirement, and a single call center can be distributed across multiple sites, or can be a virtual call center with agents working remotely through a network. Commonly, a call center can have human agents fielding incoming communications, but this is not a requirement, and call centers can be staffed with automated agents. Commonly, a call center can have a management computer for routing calls among call center agents, or for monitoring such calls.

A "cepstrum" is a nonlinear transformation of a source signal involving a first transformation (e.g. Fourier transform) into a transform domain, taking the natural logarithm of the amplitude of the transformed signal (e.g. log power spectrum), and applying the inverse of the first transformation. Various scaling or normalization factors can be applied at stages of this transformation.

A "classifier" is a tool or rule for assigning a class (dubbed a "label") to a finite data input. The classified data input can be a single data item or a collection of data items, such as a sample of an incoming voice signal, or features extracted therefrom. While some classifiers described herein are machine learning (ML) classifiers, this is not a requirement. Other classifiers can simply compare a variable (such as a likelihood of tampering) with one or more thresholds to determine a severity level of a vishing threat.

A "client" is a hardware or software computing entity that uses a resource provided by another hardware or software computing entity dubbed a "server." The resource can be provided by executing one or more software modules comprising computer-executable instructions, and can be provided as a "service." In varying examples, the server can be a single computing device, a multi-processor or distributed computing system, or a cloud computing environment.

A "communication appliance" can refer to any powered equipment receiving, transmitting, processing, or conveying a communication signal in a communication network. Networks and appliances are not limited specifically to telephone networks and devices, as telephone signals can be embedded in other forms of communication (e.g. VoIP).

Communication appliances can include, without limitation, a switch, an exchange, or a router for a telephony protocol, an internet protocol, or another network protocol; as well as telephones and other telephony devices.

"Deep scattering spectra" (DSS) are multi-level spectra obtained by calculating first-level wavelet scattering transform coefficients of a base signal, and at least second-level wavelet scattering transform coefficients of sequences or groups of the first-level coefficients.

A "feature" is an attribute of a signal, such as a voice signal. A collection of features (e.g. spectral or cepstral coefficients, or a sequence of time samples) can be organized in an array dubbed a "feature vector." Some feature vectors can be represented or stored as a one-dimensional data structure; however, this is not a requirement, and other data structures can be used. Some features or feature vectors described herein can be fed as inputs to an ML tool such as a neural network, however this is not a requirement. Other feature vectors can be voice profiles which can be stored, retrieved, or compared, without necessarily being input to an ML tool.

A "filter" is a signal processing tool that can enhance or reduce certain features of an input signal. As an example, a low-pass filter can reduce or remove high-frequency noise in a signal. A "filter bank" can be a group of filters whose logical arrangement is to operate in parallel on different portions of a common signal. The different portions can correspond to different frequency bands or different time windows of the signal, or can be different stages in a signal processing chain. In some vishing detectors or authentication systems described herein, a filter can be implemented by a software program on a computing device. Filters can also be applied elsewhere along the path of a voice signal between two or more parties; such filters can be implemented as software on a computing device, with non-computing hardware components, or by a combination of hardware and software. Filters whose logical arrangement is in parallel can be implemented sequentially in a software embodiment.

The "frequency" of a voice signal or a component of a voice signal is the number of periods of the voice signal waveform per unit time, and can be measured in Hz. The term "pitch" is a subjective perception of the frequency "Mel frequency" is a non-linear transformation of audio signal frequency from Hz to mels, designed so that signals with equal mel separation are intended to have the same apparent ratio of perceived pitch. A variety of generally similar formulae are used in the art for transforming between frequency and mel frequency; commonly, the mel frequency is logarithmically dependent on the frequency, or the frequency is dependent on an exponential of the mel frequency. Additive or multiplicative constants may be incorporated in the transformation.

A "Gaussian mixture model" (GMM) is a representation of a distribution as a weighted sum (i.e. mixture) of Gaussian distributions.

A "hidden Markov model" (HMM) is a statistical model of a process (which can include processing of an input signal) in which a next state depends solely on a current state (i.e. without memory of past states), but the states can include unobservable (i.e. hidden) attributes.

An "identifier" (ID) refers to an attribute such as a name, number, address, voice profile, or other biometric identifier that can be used to distinguish one speaker from another, independently of the content of a given spoken signal. Example identifiers include "John Doe" (a name), "503-555-1234" (a phone number), 49-015420-323751-4 (an International Mobile Equipment Identity (IMEI)), a social security number or other government issued identifier, 192.168.102.200 (a network address or a Voice over Internet Protocol (VoIP) address), or john.doe@anywhere.com (an email address, which can be used as a VoIP address). Identifiers can be universally unique (e.g. a device IMEI), unique within some domain (e.g. a telephone extension number), or not unique (a person's name). An identifier can be determined by a match in a local directory (such as a contact list on a mobile phone, or a database of voice profiles), from an incoming call (via a caller ID facility), or can be extracted from an incoming call (e.g. by computing a voice profile). Several of these identifiers can be used in existing telephony networks as "subscriber identifiers" of persons or devices that can make or receive voice communications over the telephony network.

A "lattice" is a graph of states for a sequence of time points having links between possible states at one time point and possible states at a subsequent time point. In some lattices, a link between state A(t) and state B(t+Δt) can be tagged with a transition probability A→B. By evaluation of a lattice, a most probable sequence of states can be determined. For example, a lattice can be used in some embodiments of the disclosed technology for speech decoding, e.g. to extract a most likely word sequence from a sequence of senones.

As used in this disclosure, the term "legitimate" refers to voice signals that are not vishing signals or do not pose a vishing threat.

The term "machine learning" (ML) is used to characterize a tool, implemented by software in a computing environment, having a particular task for which its performance can improve from experience without being explicitly programmed with any attendant improvements in logic. "Training data," often comprising inputs and corresponding correct or desired outputs, refers to a corpus of data with which an ML tool can improve its performance for the particular task, and "training" refers to a process for improving the performance of the ML tool. Common ML tools in this disclosure can be classifiers and can be implemented as neural networks, but these are not requirements. Other ML tools can perform other tasks such as regression, prediction, or factor analysis, and numerous other ML implementations exist even for classifiers—including, without limitation, random forests, k-nearest neighbors, and support vector machines.

A "measure of likelihood" is a quantitative indication of the probability of an associated event, state, or condition. The measure of likelihood can be the probability ("likelihood" is synonymous) itself, or another parameter derived from the probability or indicative of the probability. For example, a high score for a particular test can be an indicator of high probability for an associated condition, even though there could be no one-to-one correspondence between the score and the probability. The measure of likelihood can be a binary variable (e.g. voice is spoofed, or not), a categorical variable (grading a likelihood or severity of a vishing threat into a finite number of categories, such as low risk, medium risk, and high risk), or a continuous variable (e.g. probability). In some examples, the measure of likelihood can contain multiple pieces of information can be organized as a data structure (e.g. vector, list, table, data record with designated fields, and so forth).

"Mel frequency cepstral coefficients" (MFCC) are cepstral coefficients computed via a mel frequency domain. An MFCC vector is a vector formed by a sequence of such MFCC for a common portion of a voice signal dubbed a "frame."

A "mobile device" is a computing device that can be operated without a fixed connection to a power source. Common mobile devices are battery-powered, but this is not a requirement, as other mobile devices can be operated from solar power, energy harvesting, or other untethered energy sources. Common mobile devices can include, without limitation, smartphones and other mobile telephones, laptop computers, tablets, or smart watches.

A "neural network" is an artificial network of "units" (or "cells") that has linkages modeled on behavior of biological neurons and can be implemented by a software program on a computer. Some neural networks described herein are "deep neural networks" (DNN) which have two or more intermediate layers between an input layer and an output layer. Some DNN described herein can have 10 or more intermediate (or, "hidden") layers. Some neural networks described herein can be "time delay neural networks" (TDNN) which can determine classifications based on shifts or separations between samples in an input stream, without requiring fixed framing (segmentation) of the stream.

A "notification" is a message or signal sent to indicate an event, condition, or state. In some examples, a notification can be issued in real-time. A notification can be based on a measure of likelihood of a vishing threat exceeding a predefined threshold.

The "posterior probability" of a state is the probability of that state, given any preceding conditions or states. For example, the posterior probability of seeing a snow plow could be 80% in view of a large snowfall the previous day, while the unconditional probability of seeing a snowplow could be about 5% if there are typically 18 snow days in a year.

A "purported speaker" is a person claimed to be the speaker of a given voice signal, as indicated by subscriber identification (e.g. caller ID) or self-identification ("Hi, this is John."). The purported speaker may or may not have uttered the given voice signal. Comparison of voice profiles can be used to confirm or repudiate authenticity of the purported speaker.

As used herein, a "real-time" procedure or notification related to vishing is one that occurs before the associated telephone call or other voice communication session terminates.

A "recipient" is a person or device receiving a voice signal. For a telephone call, the recipient is often the person being called, but this is not a requirement, and the recipient can be the caller or a participant in a group conference.

A "senone" is a distinct sound (dubbed a "phone") in a voice signal combined with information about adjacent distinct sounds to which it is coupled.

"Shifted delta cepstra" (SDC) are features of a voice signal obtained by taking differences of time-shifted pairs of cepstral coefficients.

A "speech decoder" is a tool for recognizing words from an incoming voice signal. In varying examples, the input to the speech decoder can be a direct, encoded, or indirect representation of the voice signal, with optional pre-processing to mitigate e.g. ambient noise or channel artifacts in the voice signal.

"Speech synthesis" refers to a process for transforming text to speech. The speech can be synthesized from individual phones, senones, or text tokens. The sound units of the individual phones or senones can be generated by software, or can be reproductions of samples of human speech.

"Splicing" refers to juxtaposition of two disjoint voice signal portions, often with the intent of changing the conveyed meaning. By way of illustration, a statement by a political figure "I cannot support this bill" can be edited, and two portions "I can" and "support this bill" can be spliced together to alter the speaker's meaning.

"Spoofing" refers to impersonation of a purported speaker by another source. The other source can be another person, or a speech synthesizer, or other voice processing or voice generation tool.

"Tampering" refers to deliberate manipulation of a voice signal. Examples of tampering include splicing, voice conversion (e.g. transforming speech by a first speaker to sound like a different speaker or to be unrecognizably distinct from the first speaker's voice) or, in some examples, playback or speech synthesis.

A "telephony device" is a hardware or computing apparatus at which voice communications are transmitted or received. Common telephony devices include mobile phones and agent terminals at call centers.

A "time window" is a contiguous period of time. Commonly, a voice signal can be analyzed over one time window or over a "succession of time windows." In various instances, successive time windows can be immediately adjacent one another (i.e. no overlap and no gaps), or can overlap, or can be separated by gaps.

A "user" is a person (or a party to a voice communication) on whose behalf vishing detection is performed or to whom notification of a vishing threat can be delivered.

"Vishing" (or, "voice phishing") refers to the use of voice communication for fraudulent purposes. An example of vishing can be deceptively or improperly obtaining personal or private information (e.g. social security number or other government-issued identifiers; credit card numbers or other financial indicia; passwords), but the term as used herein is not so limited. Vishing can extend to misrepresenting a person for any reason, such as tampering with playback of a voice recording for a political campaign, or to create a false alibi. Although certain examples of vishing are described herein, the term can extend to other forms of vishing, without limitation. Although vishing can be performed by a telephone caller, this is not a requirement. Vishing can be performed by a called party, in a video call, in a group conference, over a radio or television broadcast, or in a live presentation.

A "vishing threat" is a detection of an existing vishing action or a potential for a future vishing action. That is, vishing detection can identify clues associated with vishing attacks even before an improper action has occurred. For example, recognizable dialogue patterns can be used to build confidence with a call recipient, or to induce stress in the call recipient, making it more likely that the call recipient will succumb to a subsequent improper request, and e.g. disclose sensitive information. "Vishing content" can be any word patterns associated with a vishing threat including, without limitation, actual disclosure of sensitive information, requests for such disclosure, or recognizable dialogue patterns as mentioned above.

"Voice conversion" refers to a process for transforming speech by a first speaker to be unrecognizably distinct from the first speaker's voice, or in particular, to sound like a different speaker.

A "voice profile" is a biometric identifier of a person associated with and determined from the person's speech. A voice profile can be extracted from a neural network using a speaker embedding model, with optional post-processing, as described further herein. Other techniques of determining a voice profile can also be used. The voice profile can be stored as a feature vector. Other data structures for storing a voice profile can also be used.

A "voice signal" is a representation of an utterance by a person. The voice signal can be an electronic representation of the utterance, or a representation in another form suitable for computer processing. The voice signal can be a digitized waveform of an acoustic signal (a "direct representation" of the voice signal); can be encoded by an audio, speech, or telephony codec (an "encoded representation" of the voice signal); or can be a sequence of features extracted from another form of the voice signal (an "indirect representation" of the voice signal). For example, a voice signal can be presented in the form of MFCC features. An "incoming voice signal" is a voice signal transmitted to a recipient. While in some examples, the incoming voice signal represents an utterance by a caller, this is not a requirement, and in other examples, the incoming voice signal can be sourced by a called party, can be a recording presented by the caller, or can be a synthesized voice. A voice signal can include components (e.g. background music or ambient noise) in addition to spoken voice. The term "audio" is used herein as generally synonymous with voice, and can reflect the fact that although voice is of particular interest, some of the techniques applied herein can be used more generally for signals that are not voice signals. A voice signal or incoming voice signal can exist in multiple copies or forms. For example, one copy of an incoming voice signal can be delivered to a user's telephony device while another copy can be delivered to an authentication service, where further copies can be relayed to respective vishing detectors. These multiple instances of a voice signal can be identical or can have variations in form (including, without limitation, variations in representation, filtering, time delays, or persistence) while still pertaining to a same voice signal issued from a source such as a caller.

A "wavelet" is a time- and frequency-bounded component of a temporal signal such as a voice signal. Decomposition of a signal into wavelet components can be used to effectively separate components of the signal on different time or frequency scales. "Wavelet analysis" refers to a process for extracting wavelets or wavelet coefficients from a signal, and can be performed by one or more "wavelet filters" or "wavelet filter banks."

A "word" is a basic unit of human language, having one or a finite number of semantic meanings that are absent in smaller portions of the word.

A "weighted finite-state transducer" (WFST) is a finite automaton having state transitions from input to output states sometimes denoted by respective symbols. Additionally or alternatively to having weights on the input and output states, weights can be assigned to the transitions. A WFST can be applied for speech decoding.

First Example Method

FIG. 1 is a flowchart 100 of a first example method for detecting a vishing threat. In this method, an incoming voice signal is analyzed to determine whether it has been tampered with, and a real-time indication of a vishing threat is accordingly sent to a user.

At process block 110, an incoming voice signal can be monitored. For example, a voice signal received by a user can be routed to an authentication service for evaluation by one or more vishing detectors. At process block 120, DSS and SDC features of the incoming voice signal can be evaluated to determine a likelihood that that incoming voice signal has been tampered with. For example, the DSS features can indicate that the voice signal has been generated by a speech synthesizer or that the voice signal has been transformed by voice conversion. The SDC features can indicate splicing of speech segments. At process block 130, based on the measure of likelihood, a real-time indication of a vishing threat can be issued to the user. For example, if the probability of tampering exceeds a first threshold, a cautionary warning can be issued to the user. If the probability of tampering exceeds a second threshold, an urgent warning can be issued to the user. Warnings can be steady or flashing annunciators on a display screen, or audible overlays on the voice signal received by the user.

Numerous variations and extensions of the disclosed method can be implemented within the scope of the disclosed technologies. For example, the DSS features and SDC features can be determined or evaluated in particular ways described herein, or additional vishing detection techniques can be incorporated.

Second Example Method

Figure 2:
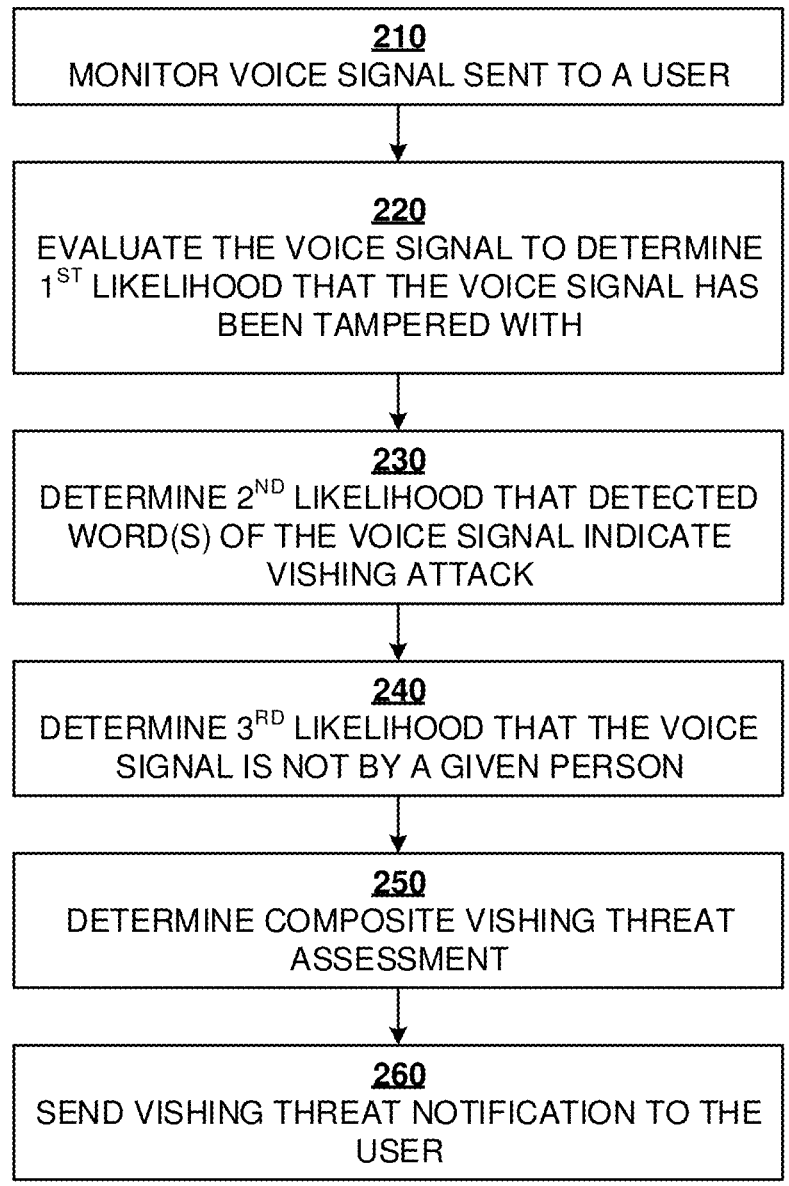
FIG. 2 is a flowchart of a second example method for detecting vishing according to the disclosed technologies.

FIG. 2 is a flowchart 200 of a second example method for detecting vishing. In this method, tampering detection, content analysis, and spoofing detection are combined to assess a vishing threat, and a notification of the vishing threat can accordingly be sent to a user.

At process block 210, an incoming voice signal can be monitored, and at process block 220, the voice signal can be evaluated to determine a likelihood P1 that the voice signal has been tampered with. For example, the evaluation can use DSS or SDC features as described herein. At process block 230, words can be detected in the incoming voice signal, and the words can be evaluated to determine a second likelihood P2 that the voice signal includes vishing content. For example, the words can be measured against content from vishing and legitimate communications. At process block 240, the voice signal can be evaluated to determine a third likelihood P3 that the voice signal was not uttered by a given person (e.g. the purported caller). For example, a voice profile can be extracted from the incoming voice signal and compared with one or more stored voice profiles of the given person.

At process block 250, a composite threat assessment can be made based on one, two, or all three of likelihoods P1, P2, P3. Based on the composite threat assessment, a real-time notification of a vishing threat can be issued at block 260.

Numerous variations and extensions of the disclosed method can be implemented within the scope of the disclosed technologies. For example, one or more of blocks 220, 230, or 240 can be omitted. In some examples, the composite threat can be based on a highest among the likelihoods P1, P2, P3. In other examples, a strong verification of the caller's voice (value of P3 below a threshold), optionally combined with low indication of tampering (value of P1 below a threshold) or a trusted status of the caller, can override a high indication of vishing content (value of P2 above a threshold) in the incoming voice signal. In further examples, a weighted sum of two or more among P1, P2, P3 can be compared with one or more threshold values to determine if a threat notification should be issued, or what level of threat notification should be issued.

Example System

Figure 3:
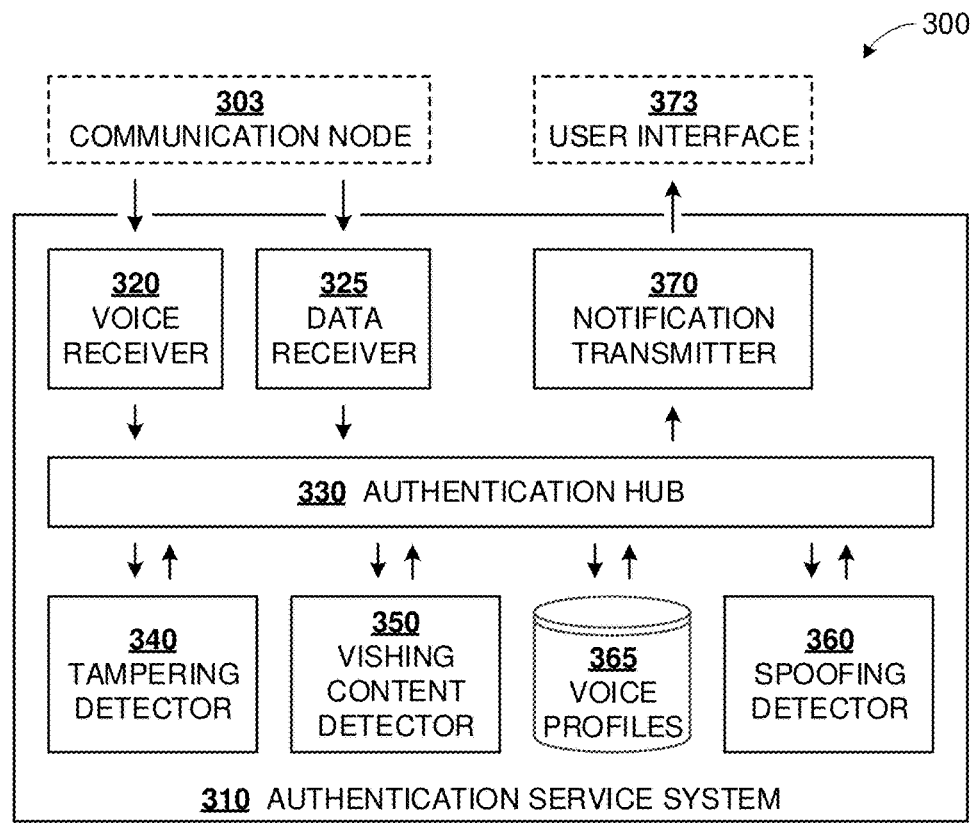
FIG. 3 is a block diagram of a system implementing an authentication service according to the disclosed technologies.

FIG. 3 is a block diagram 300 of a system implementing an authentication service. This system includes a hub communicatively coupled to input and output modules, a plurality of vishing detectors, and a database. The several components of system 300 can be implemented as software modules, comprising respective instructions, executed on one or more computing servers.

Voice receiver 320 can be coupled to receive a voice signal of an incoming call for which authentication or vishing detection is desired. For example, the voice signal can be received from an exchange, a switch, a receiving terminal or device, or other communication node 303 through which the voice signal passes. In some examples, an optional data receiver 325 can be coupled to receive data or metadata associated with the call. Such data can include a subscriber identifier (such as "caller ID", a calling phone number, or a network address) indicating a source from which the call is being received. The voice signal and data or metadata can be received from the same communication node 303 from which the voice signal is received, or from a different node.

Authentication hub 330 can transmit features of the received voice signal to a plurality of vishing detectors (e.g. 340, 350, 360) and can receive respective scores or metrics therefrom. Based on these scores, notification transmitter 370 can issue a real-time notification of a vishing threat. For example, the notification can be sent directly or indirectly to a user interface 373 for presentation to a user receiving the current call.

Vishing detector 340 can detect tampering of the voice signal, while vishing detector 350 can detect the presence of vishing content in the voice signal. Vishing detector 360 can detect whether the voice signal is spoofing the voice of a purported speaker, or otherwise does not match a recognized voice profile associated with the calling party. A plurality of voice profiles can be stored in a database 365. The purported speaker can be identified based on a purported origin of the call. To illustrate, a caller ID can indicate the purported origin of the call as 1-503-555-1212, which can be identified in a reverse directory as associated with John Smith and Mary Smith, one or both of whom can be purported speakers for voice profile comparison by vishing detector 360.

Numerous variations and extensions of the disclosed system can be implemented within the scope of the disclosed technologies. Voice and data receivers 320, 325 can perform auxiliary functions. Voice receiver 320 can perform preprocessing of the incoming voice signal. Data receiver 325 can perform a lookup of a subscriber identifier associated with the call, in an internal or external database, and can forward results of such lookup to the authentication hub 330. The notification transmitter can additionally or alternatively be coupled to communication node 303, either for inserting a notification alongside the voice signal to a user or, in cases where the vishing threat has a severity exceeding a threshold, for causing the communication node 303 to disconnect the call. Vishing detectors 340, 350, 360 can implement one or more methods described herein, or other methods. Inasmuch as vishing detectors 340, 350, 360 can operate on specific features (e.g. DSS, SDC, MFCC features, senones, or a voice profile), in some examples such features can be extracted by authentication hub 330 and conveyed to the respective vishing detector. In other examples, authentication hub 330 can forward voice signals intact, as received from voice receiver 320, to the vishing detectors 340, 350, 360, and the features of the voice signal can be a stream of voice signal samples. In some examples, one or two of vishing detectors 340, 350, 360 can be omitted; or other vishing detectors can be introduced. Scores from multiple vishing detectors (e.g. 340, 350, 360) can be processed to obtain a composite score, to determine whether a vishing threat notification should be issued, or to determine what level of notification to issue. Such processing can variously be performed by authentication hub 330, notification transmitter 370, or by an auxiliary software module.

Example Mobile Device Application

Figures 4, 5:
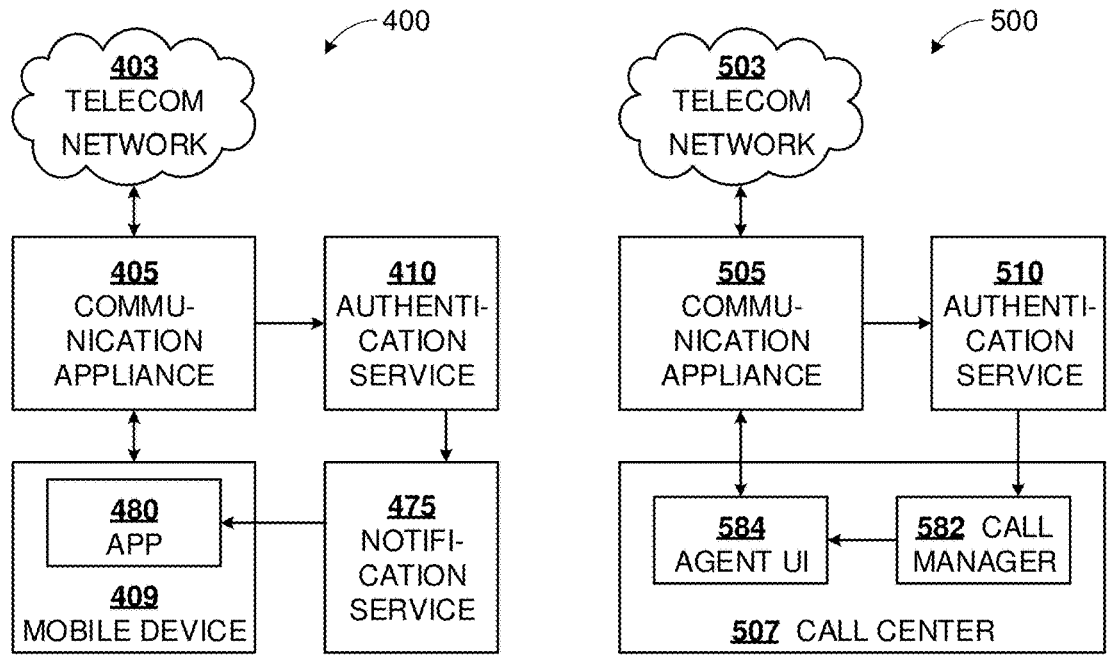
FIG. 4 is a block diagram of an authentication system integrated with a mobile device, according to the disclosed technologies.
FIG. 5 is a block diagram of an authentication system integrated with a call center, according to the disclosed technologies.

FIG. 4 is a block diagram 400 of an authentication system integrated with a mobile device. Authentication system 410 can be similar to all or part of system 310. A voice signal of a call can be transported from telecom network 403 to mobile device 409 through a communication appliance 405, which can be a switch, exchange, or router for a telephony protocol, an internet protocol, or another network protocol. In some examples, appliance 405 can be a FreeSWITCH node. As indicated by bidirectional arrows in FIG. 4, the call can include reverse voice signals spoken by a user of device 409, along a same path.

Authentication service 410 can be coupled to receive the incoming voice signal, and optionally associated data or metadata, from appliance 405. Based on one or more determinations made by vishing detectors of service 410, a notification of a vishing threat can be delivered to an app 480 installed on mobile device 409. For example, a notification alert can be posted by a notification transmitter (similar to 370) to a notification service 475. App 480 can be subscribed to the notification service 475 in order to receive vishing notifications. In some examples, push technology can be used to deliver the notification to app 480. App 480 can present the notification to a user of device 409 by an audible tone, visually, or by a haptic indication (e.g. vibration of device 409). The presentation can vary according to a type (e.g. spoofing vs. vishing content), likelihood, or estimated severity of the vishing threat.

Numerous variations and extensions of the disclosed system can be implemented within the scope of the disclosed technologies. For example, the authentication service 410 can be hosted on communication appliance 405, or installed on the mobile device 409. Notification service 475 can be omitted. The authentication service can be selectively triggered, either automatically based on a purported origin of the call, or by a user selection on the mobile device 409.

Example Call Center Application

FIG. 5 is a block diagram 500 of an authentication system integrated with a call center. Authentication system 510 can be similar to all or part of system 310. A voice signal of a call can be transported from telecom network 503 to an agent user interface (UI) 584 of call center 507 through a communication appliance 505, which can be a switch, exchange, or router for a telephony protocol, an internet protocol, or another network protocol. In some examples, appliance 505 can be a FreeSWITCH node. As indicated by bidirectional arrows in FIG. 5, the call can include reverse voice traffic originated by an agent at UI 584, along a same path. The appliance 505 can be hosted within call center 507, but this is not a requirement.

Authentication service 510 can be coupled to receive the incoming voice signal, and optionally associated data or metadata, from appliance 505. Based on one or more determinations made by vishing detectors of service 510, a notification of a vishing threat can be delivered to the agent UI 584 for presentation to the agent. For example, a first notification alert can be delivered to a call manager 582 of the call center 507, and a second notification alert can be relayed to the UI 584. The second notification alert can be presented to the agent via inline audio overlaid on the incoming voice signal, or by a visual annunciation on a display screen. In some scenarios, the notification can cause automatic termination of the call, either at call manager 582 or at agent UI 584.

Numerous variations and extensions of the disclosed system can be implemented within the scope of the disclosed technologies. For example, the authentication service 510 can be hosted within call center 507, even hosted on a same computing node as the UI 584. The routing of first and second notifications can be performed via appliance 505 rather than via call manager 582.

Third Example Method

Figure 6:
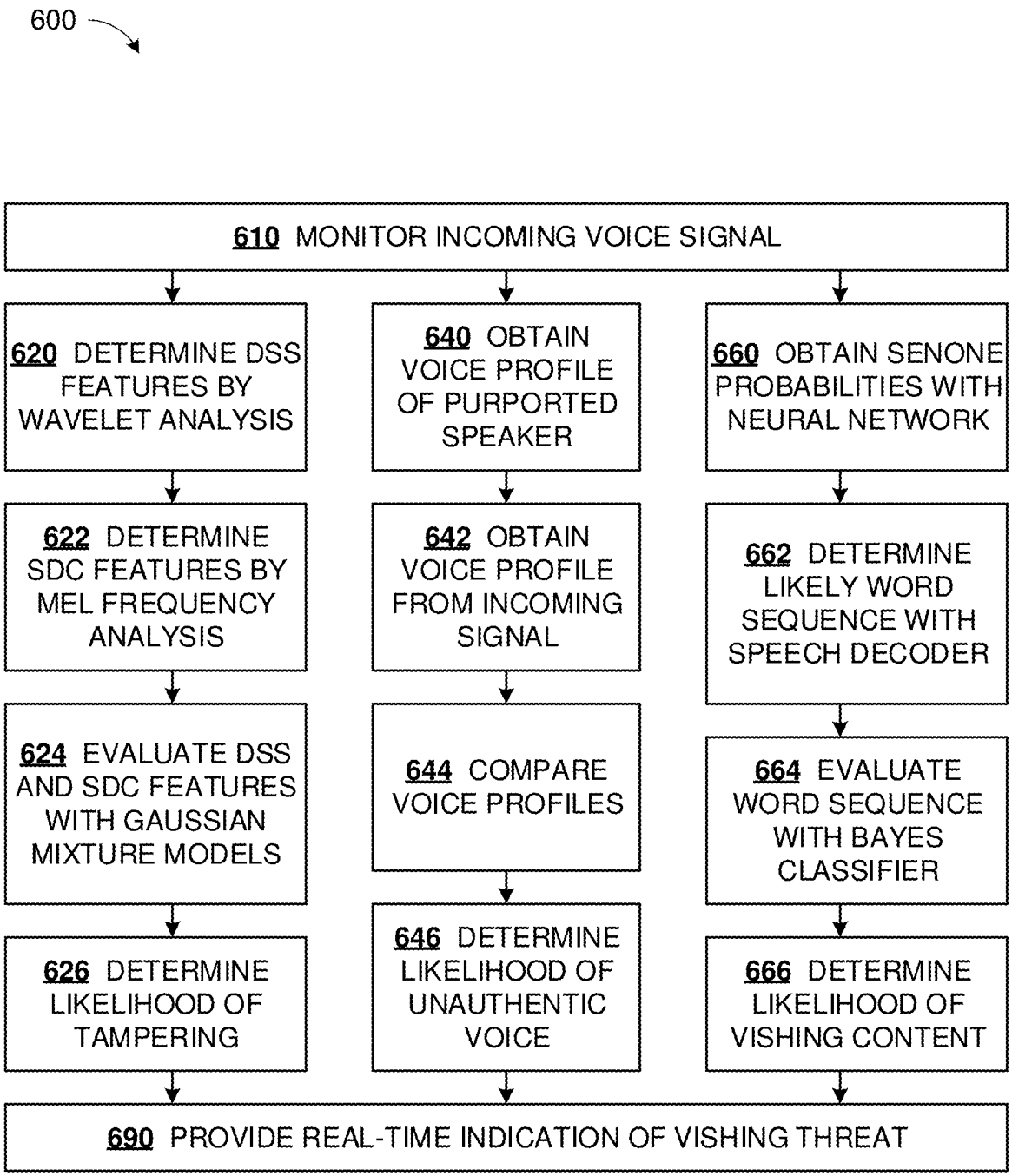
FIG. 6 is a flowchart of a third example method for detecting vishing according to the disclosed technologies.

FIG. 6 is a flowchart 600 of a third example method for detecting vishing. In this method three vishing detectors operate in parallel on an incoming voice signal, and an output block provides a real-time indication of a vishing threat.

At process block 610, an incoming voice signal can be monitored. The voice signal can be destined for a user on behalf of whom vishing detection is being performed. In some examples, this voice signal can be within a telephone call to the user, however this is not a requirement. In other examples, vishing detection can be performed on behalf of the originator of a call, to authenticate the called party, and in further examples, vishing detection can be performed in the context of a group voice or video conference.

Within flowchart 600, three columns of process blocks pertain to respective vishing detectors, some or all of which can be implemented or enabled in a given embodiment of the disclosed technology. As an example, the method can be implemented as computer-readable media storing instructions supporting all three vishing detectors, or additional vishing detectors, only certain ones of which can be activated or enabled in a given deployment. That is, vishing detectors can be subject to independent license activation. Vishing detectors can be selectively enabled by user or administrator configuration of a particular deployment, or on a call by call basis.

Left-hand column of process blocks 620-626 pertain to a tampering detector; middle column 640-646 pertain to a spoofing detector; and right column 660-666 pertain to a vishing content detector. These columns can perform operations similar to process blocks 220, 240, 230 respectively, and can be performed by software modules similar to vishing detectors 340, 360, 350 respectively.

Starting with the tampering detector, at process block 620, the incoming voice signal, or features derived from the voice signal, can be evaluated by wavelet analysis to determine DSS features. At process block 622, the incoming voice signal, or features derived from the voice signal, can be evaluated by mel frequency analysis to determine SDC features. At process block 624, the DSS and SDC features can be evaluated with Gaussian mixture models. Based on this evaluation, at process block 626, likelihood of tampering in the incoming voice signal can be determined and a measure of such likelihood can be outputted to process block 690.

Turning to the spoofing detector, at process block 640, a voice profile of a purported speaker can be obtained, for example by identifying the purported speaker based on caller ID and retrieving the associated voice profile from a database similar to 365. At process block 642, a voice profile can be obtained from the incoming voice signal, or from features extracted therefrom. At process block 644, the two voice profiles obtained at blocks 640, 642 can be compared. Based on this comparison, at process block 646, a likelihood of an unauthentic voice for the purported speaker, i.e. a spoofed voice, can be determined, and a measure of such likelihood can be outputted to process block 690.

Continuing to the vishing content detector, at process block 660, senone probabilities can be extracted from the incoming voice signal using a neural network. At process block 662, a likely word sequence can be determined by a speech decoder operating on the senone probabilities. Then, at process block 664, the likely word sequence can be evaluated with a Bayes classifier whereby, at process block 666, a likelihood of vishing content in the voice signal can be determined. A measure of such likelihood can be outputted to block 690.

Process block 690 can receive inputs from one or more active vishing detectors such as blocks 626, 646, 666, and can determine a composite assessment of vishing threat in the incoming voice call. Based on this assessment, block 690 can determine whether to issue a vishing threat notification and, optionally, a level or type of the vishing threat, and can provide a real-time indication of the vishing threat accordingly.

Numerous variations and extensions of the disclosed system can be implemented within the scope of the disclosed technologies. As described herein, different criteria can be employed to ascertain a vishing threat based on the measures of vishing likelihood from respective vishing detectors. The real-time indication (or, notification) can be provided in various ways. The indication can be issued by an authentication service or by software locally resident on a telephony device. Issuance can be local, e.g. by display of a message on a telephony device or from an authentication service to a co-located notification service. Issuance can be remote, by transmission over a network. The indication can be delivered to an app or agent UI on a telephony device, to an administrator console, or to a storage system. In some examples, the real-time indication can be transmitted at block 690 to a call participant receiving the incoming voice signal, while in other examples, the real-time indication can be transmitted to a computing system (e.g. in a call center similar to 507) managing the recipient's call. In further examples, the vishing threat indication can be logged at a logging system. Vishing threats below a threshold can be logged but not reported to the voice signal recipient.

Example Tampering Detection

Figure 7:
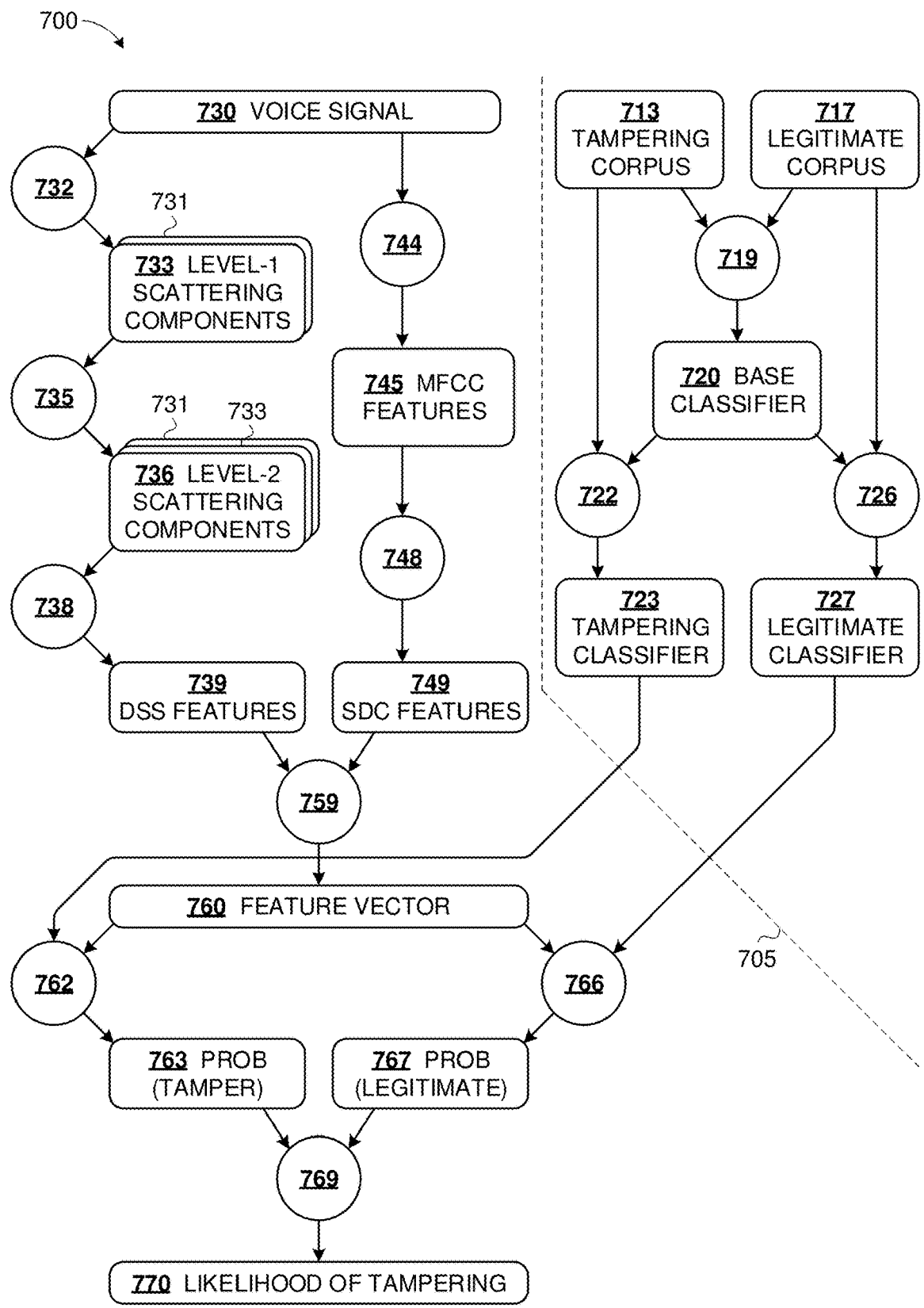
FIG. 7 is a dataflow diagram for detecting tampering according to an example of the disclosed technologies.

FIG. 7 is an example dataflow diagram 700 for detecting tampering. In this method, at run-time, a voice signal is processed to derive DSS and SDC features, from which a feature vector is formed. The feature vector is input to two trained ML tools to determine respective probabilities of tampering and legitimacy, from which a likelihood of tampering is determined. Flowchart 700 also indicates operations for training the ML tools, prior to run-time. The run-time portions of flowchart 700 are shown to the left of dashed line 705 and can be performed at a process block similar to 220, or can be performed by a software module similar to 340. The training portions of flowchart 700 are to the right of line 705.

Starting with DSS feature determination, voice signal 730 can be input to process block 732 to generate level-1 scattering components 733. Process block 732 can incorporate a multi-octave filter, using e.g. a wavelet transform. A level-0 scattering component 731 can also be generated. The level-1 scattering components can be input to process block 734 to generate level-2 scattering components 736, with the level-0 and level-1 scattering components 731, 733 being carried along intact. Process block 734 can incorporate a bank of multi-octave filters for respective ones of the level-1 scattering components. The level-0, -1, -2 scattering components (731, 733, 736) can be input to process block 738 to obtain a vector of DSS features 739. Because the multi-octave filter banks of blocks 732, 735 can generate outputs at varying rates, some of the scattering components 731, 733, 736 can be resampled (e.g. upsampled or downsampled) to achieve a uniform sampling rate in the components of DSS features 739.

Continuing with SDC feature determination, voice signal 730 can also be input to process block 744 to generate MFCC features 745. Process block 744 can include mel frequency cepstral computation for respective time windows of the incoming voice signal 730. The MFCC features 745 can be input to process block 748 to obtain SDC features 749. Process block 748 can calculate deltas (differences) between MFCC features of successive time windows and can aggregate these differences to form a vector of SDC features 749.

The DSS features 739 and the SDC features 749 can be input to process block 759 to obtain a feature vector 760. Process block 760 can perform time alignment, aggregation, or pruning of the feature vectors 739, 749 to generate feature vector 760. Feature vector 760 can be processed in conjunction with trained ML classifiers 723, 727 to obtain respective probabilities 763, 767 that the voice signal contains vishing content, and that the voice signal has legitimate content (i.e. lacks vishing content). The tampering classifier 723 can be applied to feature vector 760 at process block 762, while the legitimate classifier 727 can be applied to feature vector 760 at process block 766. The tampering and legitimate probabilities can be input to process block 769 to determine a measure of the likelihood of tampering 770. Process block 769 can incorporate a log likelihood ratio calculation.

Turning to training operations, the flowchart begins with a corpus 713 of data obtained from communications (e.g. recorded phone calls) in which tampering was present, and another corpus 717 of data obtained from legitimate communications, in which tampering was not present. In the depicted example, a two-stage training procedure is used. The two corpora 713, 717 can be input to process block 719 to obtain a base classifier 720. In examples, the base classifier can be a GMM. Then, the base classifier 720 can be further trained with just the tampering corpus 713 at block 722 to obtain tampering classifier 723. That is, tampering classifier 723 can be trained to distinguish tampered signals among a collective pool of tampered and legitimate signals. Similarly, the base classifier 720 can be further trained with just the legitimate corpus 717 at block 726 to obtain legitimate classifier 727. That is, legitimate classifier 727 can be trained to distinguish legitimate signals among a collective pool of tampered and legitimate signals.

In one embodiment, the GMMs can be configured with 64 mixture components, eight iterations of expectation-maximization (EM) can be used for training at block 719, and one EM iteration can be used for training at each of block 722, 726. These numbers are illustrative and wide variations can be used. For example, GMM size can range from 20 to 200, or 40 to 100 components; and 1-20 training iterations can be used at any of the training stages. Further, blocks 762, 766 can select a subset among the components of GMMs 723, 727 to improve computational efficiency. For example, base classifier 720 can be applied to feature vector 760 to determine a subset of the GMM components having highest contribution to feature vector 760, and this subset can be used at blocks 762, 766. The subset size can be about 12-30 components, or about 20 components.

1. Example Determination of DSS Features

Figure 8:
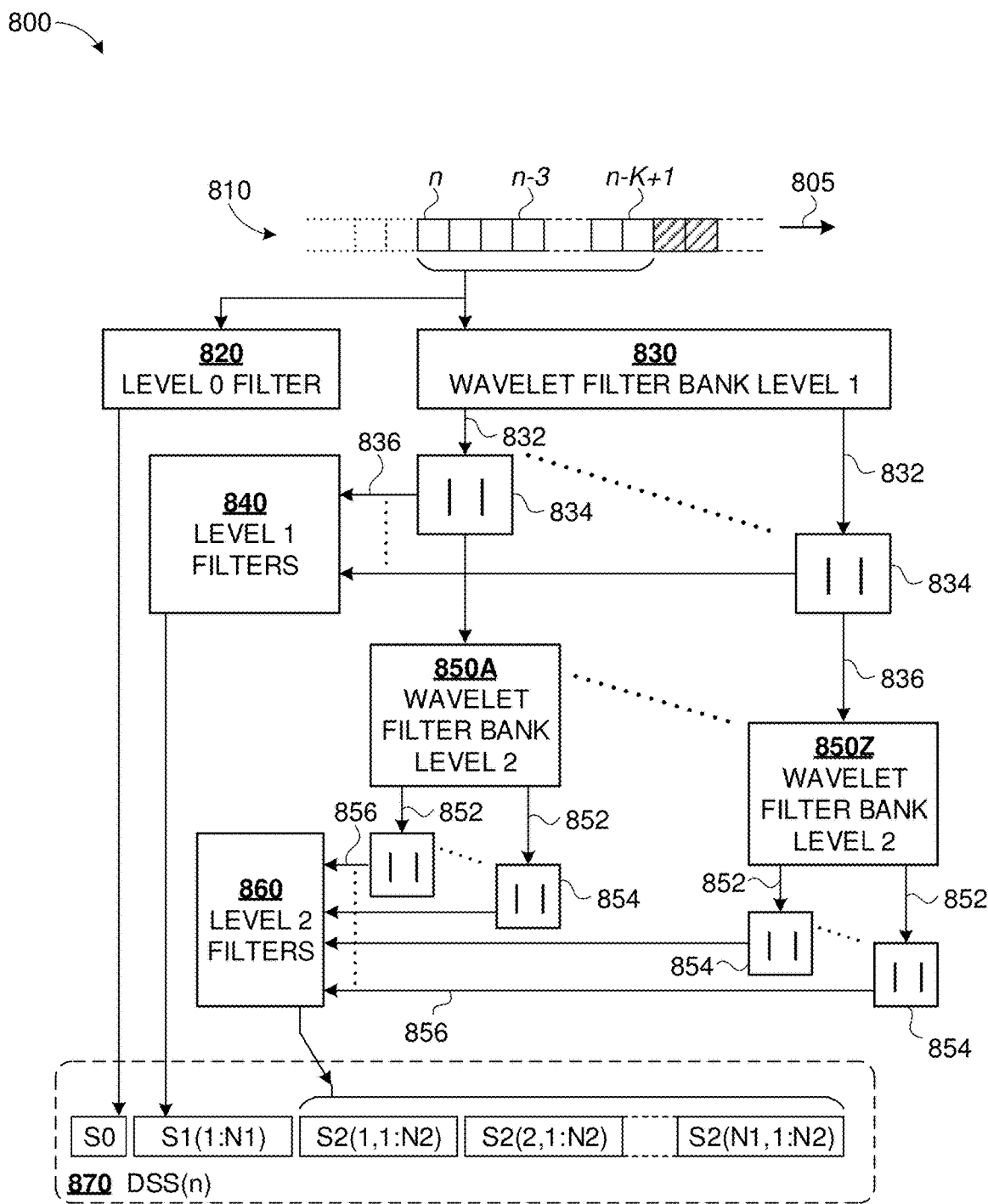
FIG. 8 is a block diagram of a subsystem for determining DSS features according to an example of the disclosed technologies.

FIG. 8 is a block diagram 800 of a subsystem for determining DSS features. In this subsystem, wavelet filter banks, magnitude operations, and other filters are used to obtain successive spectral levels of an incoming voice signal, which can be combined to generate a vector of DSS features. The illustrated subsystem can implement an example of process block 620, or an example of the left-hand path of dataflow diagram 700, from voice signal 730 to DSS features 739.

Data stream 810 is a continuous sequence of voice signal values. The values of stream 810 can represent a digitized voice signal waveform, and can be obtained by decoding an encoded telephony voice signal. Without limitation, examples of telephony encoding/decoding standards, codecs, and technologies include CELP, G.711, G.729, GSM, iLBC, LPC, SILK, Opus, or Speex. The oldest values of stream 810 are on the right, the newest value is labeled "n", and future values not yet arrived are shown in dotted outline to the left of sample n. As illustrated, a time window of length K samples is active, from sample n−K+1 to sample n. The older values to the right of sample n−K+1 have fallen out of the active time window, and are shown cross-hatched. As new samples arrive in stream 810, the stream shifts successively to the right, as indicated by arrow 805.

Voice sample stream 810 is input to level-1 wavelet filter bank 830 and also to level-0 filter 820. As illustrated, wavelet filter bank 830 operates on the illustrated time window of K samples. The level-0 filter 820 can operate on a single sample (commonly, sample n) or on a group of samples which can be of size K, or of a different size. The level-0 filter can variously implement a finite impulse response (FIR) filter, an infinite impulse response (IIR) filter, or another filter type.

Wavelet filter bank 830 can generate outputs covering a range of spectral bins (or, channels), which can be contiguous, overlapping, or separated by gaps. The outputs can cover multiple octaves, with multiple outputs per octave, with the widths of spectral bins varying in geometric progression. Wavelet filter bank 830 can cover L1 octaves, with M1 outputs per octave, for a total of L1·M1 or L1·M1+1 bins, depending on how endpoints of the spectral range are handled. To illustrate, an octave from 100-200 Hz can have M1=4 bins centered at about 109.0, 129.7, 154.2, 183.4 Hz, while the next octave 200-400 Hz can have M1=4 bins centered at about 218.1, 259.4, 308.4, 366.8 Hz. The outputs 832 are passed to respective magnitude blocks 834, which compute the magnitudes of the wavelet filter outputs For example, the magnitude of −3.3 is 3.3 and the magnitude of (1+i2) is $\sqrt{5}$ or about 2.236.

Output from magnitude blocks can be forwarded to a set of level-2 wavelet filter banks 850A-850Z, one filter bank for each output channel of the level-1 filter bank 830. As for the level-1 filter bank 830, the outputs 852 of the level-2 filter banks can be passed to respective magnitude blocks 854. In some examples, outputs 852 can be non-uniform over the frequency band covered by level-1 filter bank 830. In an example, wavelet filter banks 850A-850Z can include up to L2=2 octaves and M2=4 bins per octave, for up to 8 output channels 852 for each of the filter banks 850A-850Z. In mid-range frequencies where most signal energy of an incoming voice signal is concentrated, the full complement of 8 output channels 852 can be used, gradually tapering down to fewer output channels 852 towards one or both ends of the overall frequency range. Other optimization of the level-2 coefficients can also be used.

The level-1 outputs 836 of magnitude blocks 834 and the level-2 outputs 856 of magnitude blocks 854 can be inputted to temporal filters 840, 860 respectively, which incorporate one decoupled filter channel for each input channel 836, 856. Temporal filters 840, 860 can implement resampling (e.g. upsampling or downsampling) to match output rates across all level-1 and level-2 output channels. Temporal filters 840, 860 can also incorporate low-pass filtering.

Finally, the temporally aligned outputs of filters 820, 840, 860 can be concatenated to form a DSS feature vector 870 as shown, for the time window having sample n as the newest sample. As illustrated, with N1 output channels of filter bank 830 and N2 output channels of each filter bank 850A-850Z, the DSS feature vector can include a single level-0 coefficient S0, N1 level-1 coefficients S1(1:N1), and N1·N2 level-2 coefficients, indexed from 1:N2 for each of the 1:N1 level-2 filter banks 850A-850Z.

As time progresses, successive DSS feature vectors 870 can be generated. In some examples, one DSS feature vector can be generated for each successive sample in stream 810, i.e. respective feature vectors 870 for samples n, n+1, n+2, which can be denoted as a stride of 1. In other examples, one DSS feature vector can be generated with a stride of K. That is successive feature vectors 870 can be generated for trailing samples n−K, n, n+K, and so forth. Other strides can be used. In some examples, resampling can be applied to obtain a non-integer stride.

In one embodiment, the stride can be set to K/2 (50% overlap) for samples of length 256 ms; i.e. a stride of 128 ms. The vector 870 can include one level-0 coefficient (S0), 60 level-1 coefficients (e.g. L1=4 octaves of analysis×M1=15 bins per octave, and 222 second order coefficients (e.g. L2=2 octaves of analysis×M2=4 bins per octave×60 level-1 coefficients=480 coefficients, pruned to 222). Additionally, an extra component (not shown in FIG. 8) for the logarithm of the energy in the voice sample can be included within vector 870. These parameters can be varied considerably. In examples, the analysis range (L1) can be two to eight octaves, often three to five octaves; and the length of the output vector 870 can be 40 to 1,000 coefficients, 100 to 700 coefficients, or about 200 to 400 coefficients.

2. Example Determination of SDC Features

Figure 9:
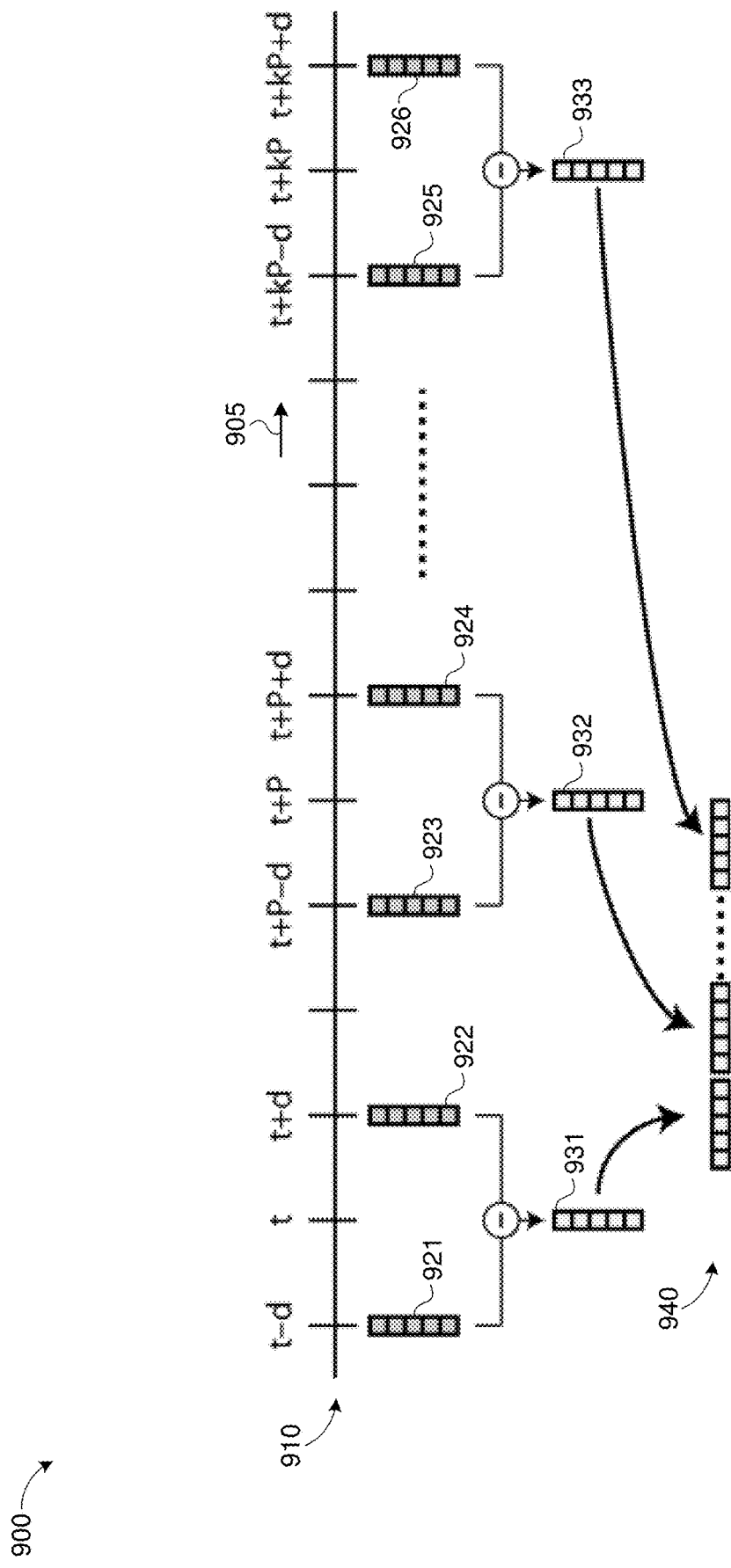
FIG. 9 is a diagram illustrating determination of SDC features according to an example of the disclosed technologies.

FIG. 9 is a diagram 900 illustrating determination of SDC features. Data stream 910 is an input stream of voice signal samples, with time increasing to the right as indicated by arrow 905, so that samples at t−d are older than samples at t+d.

MFCC vectors 921-926 are computed for time windows offset by ±d samples from central times t, t+P, . . . t+k−P. Symmetric differences (deltas) 931-933 can be calculated at a stride of P samples from successive pairs of the MFCC vectors 921-926. These delta vectors 931-933 can be joined head-to-tail to form an output stream 940 of the components (features) of the delta vectors. The components of stream 940 can be denoted shifted delta cepstra (SDC) features for short. Although the SDC features 940 are illustrated as a stream, the features 940 can be binned to align in time and stride with successive DSS features 870.

In one embodiment, SDC feature vector can be formed by stacking seven delta vectors 931-933; that is k=6 in FIG. 9. The input stream of voice samples can be sampled at a sampling frequency of 8000 Hz and divided into frames by applying a window function, which can be a Hamming window, with a length of 200 samples corresponding to 25 ms to the voice samples which is shifted by 80 samples corresponding to 10 ms. A pre-emphasis filter can be applied to the signal before computing each MFCC vector 921 consisting of seven mel cepstral coefficients. Delta vectors can be computed with a time window offset d=±1.

3. Example Determination of Tampering Score

Figure 10:
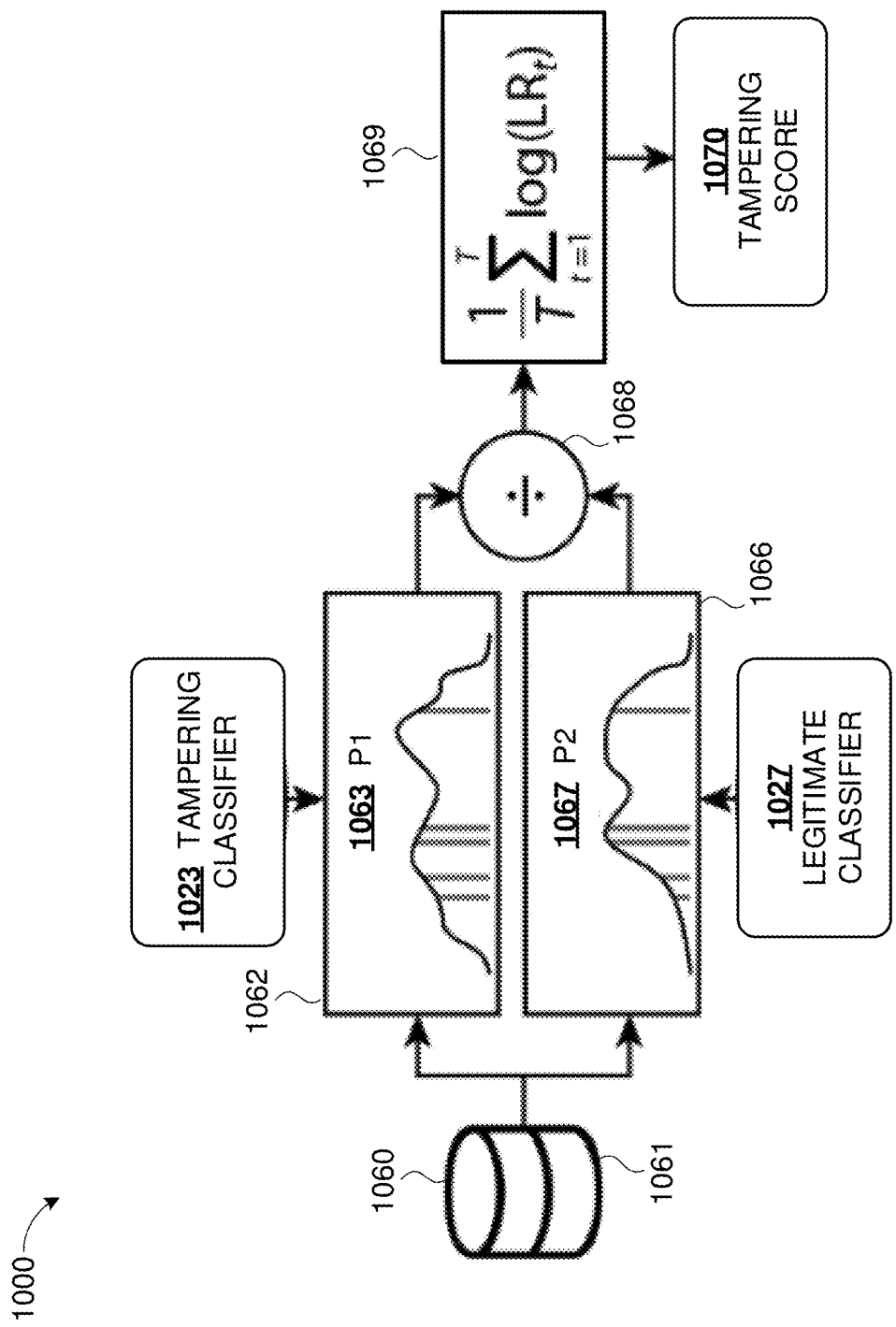
FIG. 10 is a diagram illustrating determination of a tampering score according to an example of the disclosed technologies.

FIG. 10 is a diagram 1000 illustrating determination of a tampering score. A log likelihood ratio is used to compute a measure of likelihood that an incoming voice signal has been tampered with. The operations illustrated in FIG. 10 can be similar to those encompassed in blocks 762, 766, 769 of FIG. 7.

Feature vectors 1060, 1061 represent feature vectors (similar to 760) for successive time points t. At block 1062, a feature vector 1060 can be classified by a tampering classifier 1023 to obtain a posterior probability of tampering 1063, which can be denoted as P1. At block 1066, the feature vector 1060 can be classified by a legitimate classifier 1027 to obtain a posterior probability of legitimacy 1067, denoted as P2. At block 1068, the likelihood ratio LR can be calculated as LR=P1/P2 for the feature vector 1060. Repeating these operations for successive times t (e.g. with subsequent feature vectors 1061 and so forth) can produce a succession of LR values indexed by time t. At block 1069, an average can be computed from these likelihood ratios. In some examples, the arithmetic mean over times t of the logarithm (e.g. natural logarithm ln, with base e) of LR can be used, as illustrated. This average log likelihood ratio is a measure of likelihood of tampering versus the likelihood of legitimacy, and can be used as a tampering score 1070. To illustrate, if the tampering probability P1 is steady at 90%, and if the legitimate probability P2 is steady at 30%, then the average log likelihood ratio 1070 can be evaluated as ln 3=1.099.

Numerous variations and extensions of the disclosed system can be implemented within the scope of the disclosed technologies. For example, in flowchart 700, the base classifier can be omitted, and tampering and legitimate classifiers 723, 727 can be trained independently, directly from tampering and legitimate corpora 713, 717. Alternatively, distinct classifiers 723, 727 can be omitted, and the feature vector 760 can be input to a base classifier 720 to directly obtain a likelihood of tampering 770. In subsystem 800, additional levels can be employed, i.e. the level-2 outputs 856 can be used as inputs to third level filter banks with N3 output channels each, and a total of up to N1·N2·N3 additional level-3 DSS coefficients can be incorporated into DSS feature vector 870. In some examples, filters illustrated as operating in parallel can be performed sequentially, or can be pipelined. Highly parallel computations can be accelerated using an FPGA, ASIC, or graphics processor. With respect to FIG. 9, the delta features 931-933 are illustrated as being acquired from distinct, non-overlapping time windows, however this is not a requirement. In other examples, successive deltas can be calculated between MFCCs at (t−d, t+d), (t+d, t+3d), (t+3d, t+5d), that is, with stride P=2d, so that each MFCC vector (e.g. 922) is used in two successive differences (e.g. 931). In further examples, the deltas can be staggered, e.g. successive deltas can be calculated between MFCCs at (t−d, t+d), (t, t+2d), (t−d, t+3d), and so forth.

Example Vishing Content Detection

Figure 11:
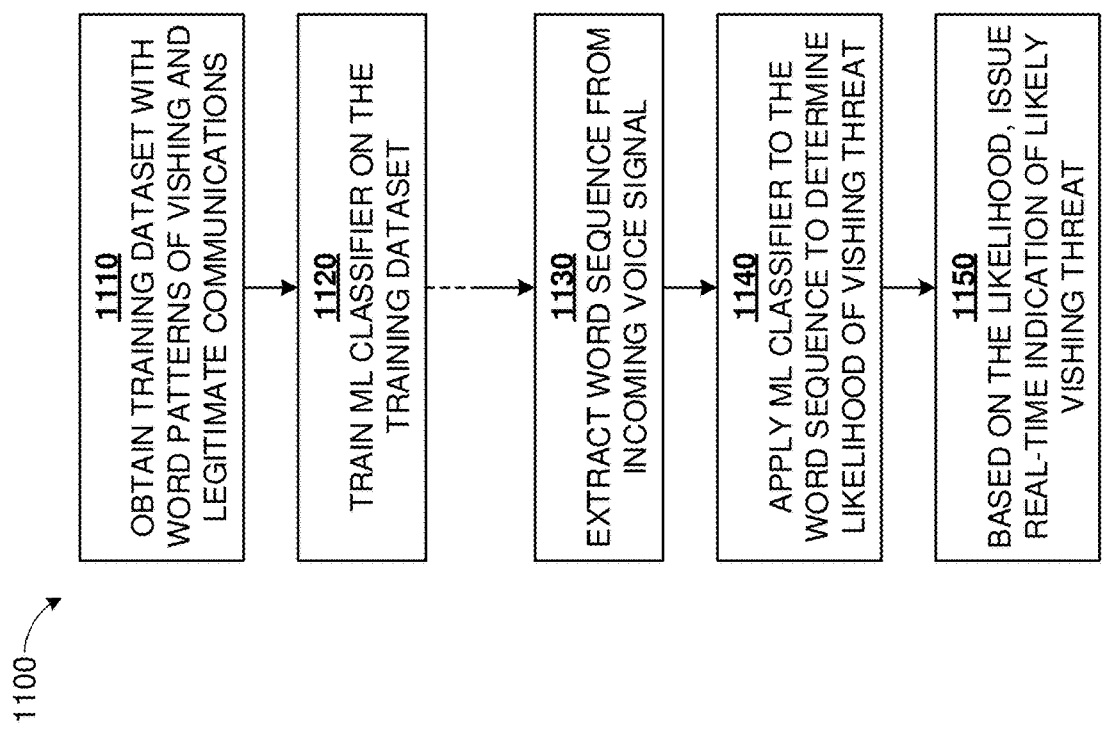
FIG. 11 is a flowchart of an example method for detecting vishing content according to the disclosed technologies.

FIG. 11 is a flowchart 1100 of an example method for detecting vishing content according to the disclosed technologies. In this method, an ML classifier is trained using word patterns recorded from vishing communications and from legitimate communications. Later, at run-time, the trained ML classifier is used to determine the likelihood of vishing content in an incoming voice signal and generate an indication of a vishing threat. The run-time operations of flowchart 1100 can be performed similarly to block 230, or can be performed by a software module similar to 350.

At process block 1110, a training dataset can be obtained. Each record of the training dataset can include one or more word patterns, along with an output label indicating that the word pattern is from a vishing communication or from a legitimate communication. At process block 1120, an ML classifier can be trained to classify one or more word patterns (e.g. in a sequence of words) as having a likelihood of indicating vishing or of indicating legitimacy. The ML classifier can be a naïve Bayes classifier incorporating conditional probabilities that an incoming word sequence is associated with vishing, conditioned on word patterns embedded within the word sequence.

Proceeding to run-time, at process block 1130, a word sequence can be extracted from an incoming voice signal. The word sequence can be a most likely word sequence as determined by a speech decoder. At process block 1140, the trained ML classifier can be applied to the word sequence to determine a measure of likelihood that the incoming voice signal contains vishing content or indicates a vishing threat. At process block 1150, based on the measure of likelihood, a real-time notification of a vishing threat can be transmitted to a recipient of the incoming voice signal.

1. Example Neural Network

Figure 12:
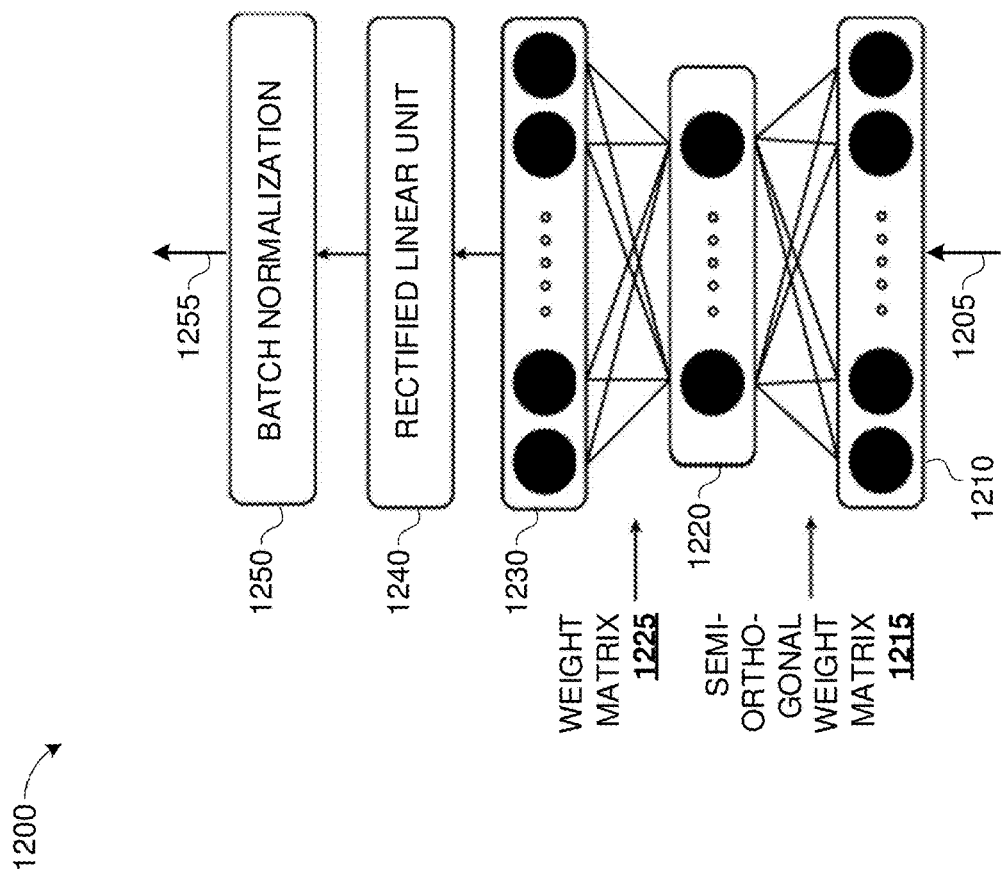
FIG. 12 is a diagram of a neural network used for detecting vishing content according to an example of the disclosed technologies.

A time delay neural network (TDNN) can be used to extract senone posterior probabilities from an incoming voice signal. FIG. 12 is a diagram of a neural network layer 1200 used as one stage of such a TDNN. In layer 1200, weights can be factorized to implement a bottleneck 1220 between input sub-layer 1210 and an intermediate output sub-layer 1230. Sub-layer 1230 feeds sub-layers including rectified linear unit (ReLU) 1240 and batch normalization 1250. Thus, neural network layer 1200 receives input at arrow 1205 (e.g. from a preceding neural network layer) and generates output to be processed by a following neural network layer at arrow 1255.

To illustrate, neural network layer 1200 can have 640 input units in sub-layer 1210, 640 output units in sub-layer 1230, and a bottleneck of 256 units in sub-layer 1220 for a total of 1536 neural units. The factorized matrices can include a semi-orthogonal matrix 1215 of size 640×256, and a second matrix 1225 of size 256×640, incorporating weights for connections between sub-layers 1210, 1220, 1230 as indicated.

Layer 1200 can be a time-delay neural network (TDNN) layer. A plurality of such TDNN layers can be stacked, one above another, to form the complete TDNN. Skip connections can be included. A first stage of the complete TDNN can receive the incoming voice signal (e.g. as MFCC features), and a last stage of the complete TDNN can output senone posterior probabilities. The complete TDNN can implement a hybrid acoustic model which combines the features of a deep neural network (DNN) and, implemented within the TDNN, a hidden Markov model (HMM).

In the above illustration, 11 TDNN layers similar to layer 1200 can be used. The TDNN can be operated to generate outputs at about 30 Hz (30 ms steps between successive output time points). The HMM embedded within the TDNN can be traversed in a single time step. The input time sample width at 10 Hz (i.e., 100 MFCC feature vectors per second) can be about 43 time steps, 0.21 seconds before the current output time point, and 0.21 seconds after the current output time point. The illustrative numbers are merely exemplary, and similar TDNNs with widely varying parameters can be deployed, with some tradeoffs in latency, accuracy, and utilization of computing resources. In a further example, the input MFCC feature vectors can have 40 elements, and 43 consecutive frames can be taken as input (40×43=1720 total input elements). The TDNN can include parameters for the 11 factorized TDNN layers (1536 input and output units each), interspersed batchnorm layers (having means and variances for each element), and a (log) softmax layer with over 6000 units (senones). In such an example, a total number of parameters can be about 24 million.

Output of the TDNN can be inputted to a speech decoder to determine a most likely sequence of words in the incoming voice signal. The speech decoder can incorporate a weighted finite state transducer (WFST) and can generate a lattice of alternative word sequences as successive senones are recognized and added to the processed signal stream. A most likely path through the lattice can be determined as the most likely sequence of words in the incoming voice signal.

Example Spoofing Detection

1. Example Voice Profile Processing

Figure 13:
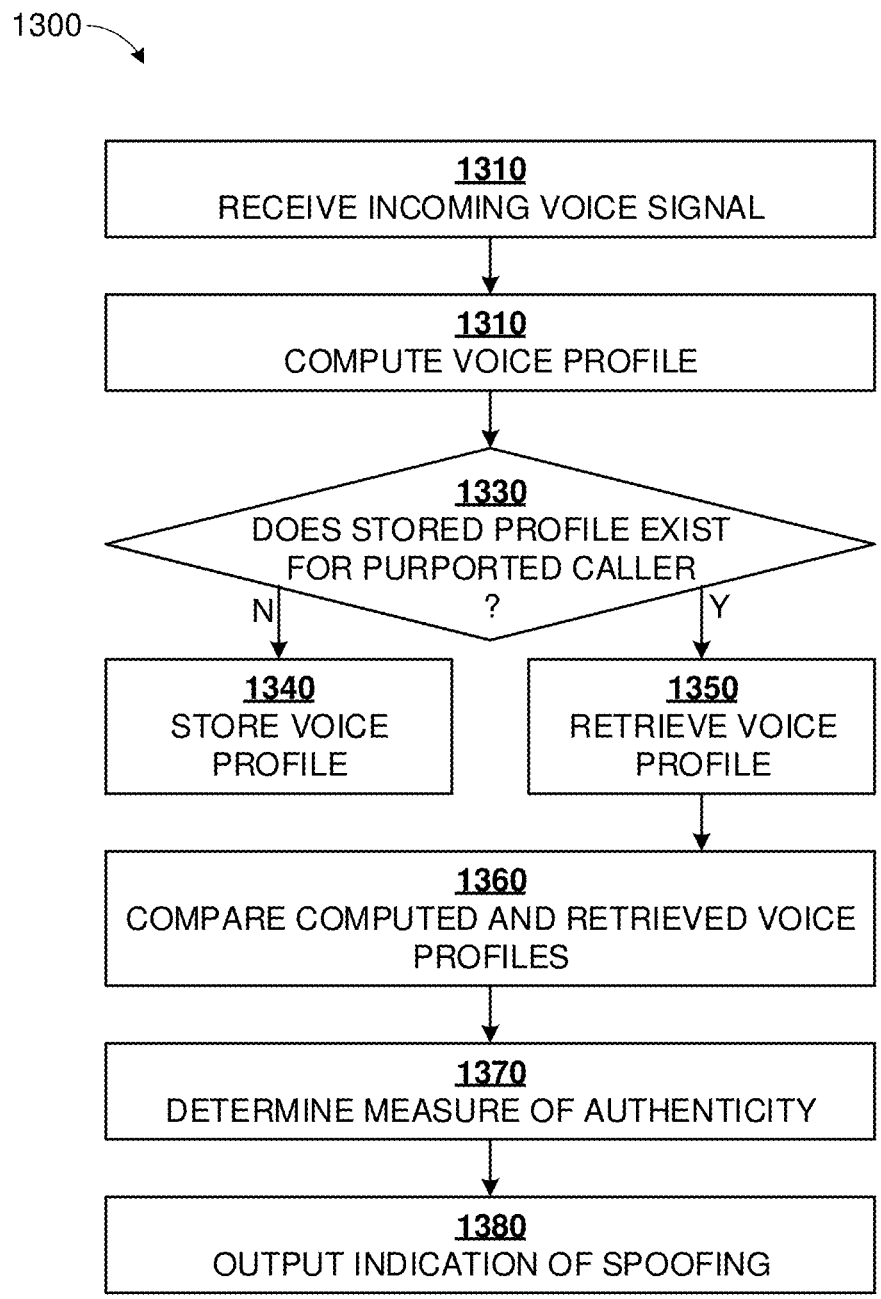
FIG. 13 is a flowchart of an example method for processing a voice profile according to the disclosed technologies.

FIG. 13 is a flowchart 1300 of an example method for processing a voice profile according to the disclosed technologies. This method supports a variety of use cases for new and previously existing voice profiles and, accordingly, varying portions of the method can be implemented in corresponding embodiments.

At process block 1310, a voice signal is received. The voice signal can be received by a recipient on whose behalf vishing detection is being performed, and can be part of a call to the recipient, a call originated by the recipient, or a group conference. At block 1320, a voice profile can be computed from the received voice signal.

At decision block 1330, a determination is made whether a voice profile exists for a purported source individual (e.g. a caller). If the profile does not exist (in an accessible remote or local database similar to 365), then the method can follow the N branch to block 1340, where the computed voice profile can be stored in such database. However, if the profile does exist, then the method can follow the Y branch from block 1330 to block 1350, where the stored voice profile can be retrieved.

At process block 1360, the computed and retrieved voice profiles can be compared, and at block 1370, a measure of authenticity (or conversely, a measure of likelihood of spoofing) can be determined. Finally, based on this measure, an indication of spoofing can be outputted at block 1380.

2. Example Neural Network

Figure 14:
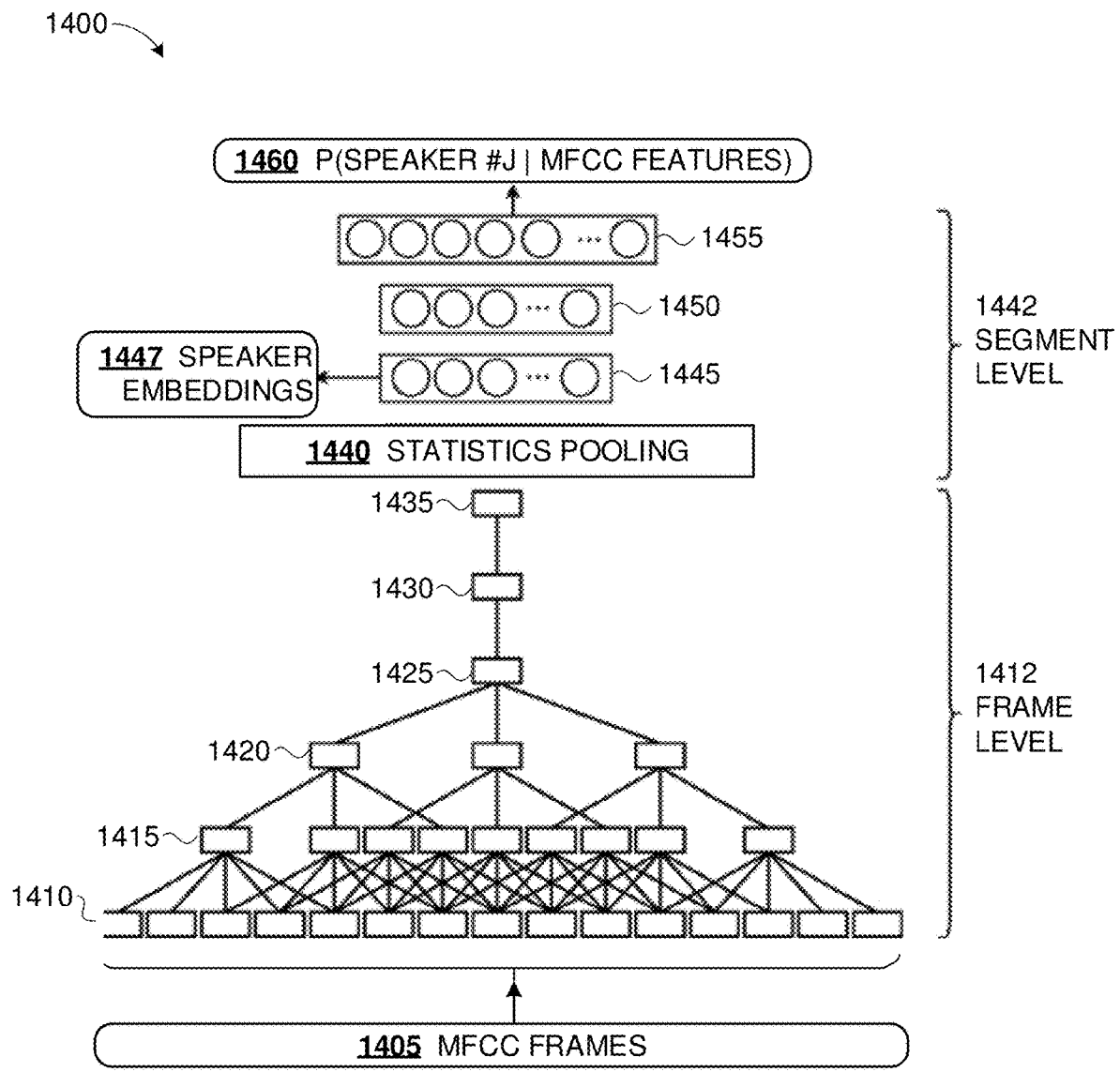
FIG. 14 is a diagram of a neural network used for processing a voice profile according to an example of the disclosed technologies.

FIG. 14 is a diagram of a neural network 1400 used for obtaining a voice profile using a speaker embedding approach. In this approach, the neural network 1400 can be trained to identify a speaker among a group of speakers, with an individual output of output layer 1460 assigned to each speaker in the group. Then, the activations at intermediate layer 1445 for voice input from a given speaker can be extracted as the profile of the given speaker, whether or not the given speaker is one of the training speakers.

Frames of MFCC features 1405 are input to the input layer 1410 of neural network 1400. Each box of layer 1410 represents a corresponding time index of an incoming voice signal. That is, each box of layer 1410 can incorporate multiple cells for respective MFCC features of the instant frame. At layers 1415, 1420, 1425, the frames can be concatenated, first 5-way, and then 3-way as shown, with strides of 1 frame, 2 frames, and 3 frames respectively. Each of these layers 1415, 1420, 1425 adds context from neighboring frames to a central time index. Layers 1430, 1435 implement additional mixing without further extending the reach of neighboring context. Collectively, layers 1410, 1415, 1420, 1425, 1430, 1435 operate on frames, and can be denoted a frame level 1412 of neural network 1400. Frame level 1412 can have a time delay structure (TDNN).

Statistics pooling layer 1440 sits atop the frame level 1412, and can compute statistics such as average and standard deviations across outputs of layer 1435. Layers 1445, 1450 receive input from statistics pooling layer 1440 and deliver output to output layer 1455. Output layer 1455 can have a number of outputs equal to a number of training speakers used to train neural network 1400. The outputs 1460 from layer 1455 can be trained to give 1 on the $J^{th}$ output for input from speaker J, and 0 on all other outputs, and similarly for other training speakers. In a general case (i.e. for a speaker who may or may not be one of the training speakers), the outputs 1460 can be regarded as conditional probabilities that a current speaker is speaker J, conditioned on the MFCC frames 1405 input to the neural network 1400. The frame level 1412 and embedding layers 1445, 1450 can implement linear activation functions as well as rectified linear units (ReLU), while output layer 1455 can implement a softmax activation function.

The activations at layer 1445 for MFCC frames 1405 of a current voice signal can be extracted for use in determining a voice profile 1447 of the current speaker. In some examples, additional post-processing can be performed on the layer 1445 activations to derive the speaker's voice profile 1447. The additional processing can aid in reducing effects of channel degradation, ambient noise, reverberation, or other extrinsic factors. After network 1400 has been trained, the posterior probabilities 1460 can be superfluous, and layers above 1445 can be discarded. The remaining layers (1410 through 1445), together with optional post-processing, can be used to implement some examples of process block 1310. The voice profile 1447 can be obtained as a vector of a fixed predetermined length.

3. Post-Processing with Linear Discriminants

In some examples, post-processing on the activations of layer 1445 can include application of one or more canonical linear discriminant functions (CLDF) (a form of linear discriminant analysis, LDA). This technique can reduce dimensionality of the layer 1445 activations, and can maximize separation between classes associated with respective speakers in the training data.

Figure 15:
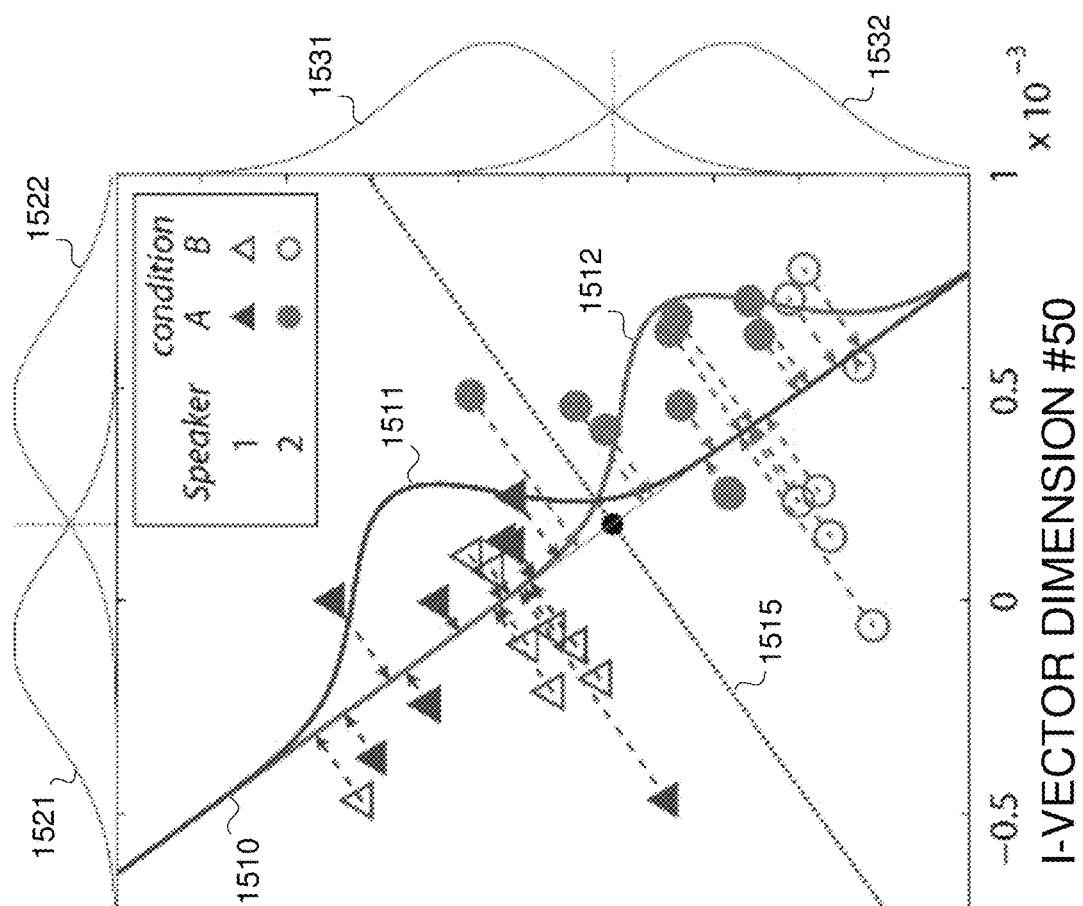
FIG. 15 is a chart illustrating post-processing of speaker data using a linear discriminant technique, according to an example of the disclosed technologies.

FIG. 15 is a chart 1500 illustrating a linear discriminant technique in two dimensions for two speakers. This technique can be applied during training. Multiple speech samples are obtained from speaker 1 and speaker 2, and respective activations are extracted from layer 1445 as dimensions of respective feature vectors. Chart 1500 shows these activations plotted along two dimensions. Speech samples from speaker 1 are indicated as triangles, while speech samples from speaker 2 are indicated as circles. Open and closed symbols illustrate variations according to the environment or channel conditions under which the various samples were obtained. In this illustration, an axis 1510 is determined such that projections of the samples onto axis 1510 have minimum overlap between the samples of the two speakers. Using such projection, the two dimensions can be reduced to a single coordinate along axis 1510. Orthogonal to axis 1510, the line 1520 forms a boundary separating the space associated with speaker 1 from the space associated with speaker 2 in these two dimensions. Curves 1511, 1512 show the distribution of sample points along axis 1510 for speaker 1 and speaker 2 respectively. Correspondingly, curves 1521, 1522 are the projections of curves 1511, 1512 along the original X axis (dimension #50), and curves L31, 1532 are the projections of curves 1511, 1512 along the original Y axis (dimension #9).

A similar procedure can be extended to other pairs of dimensions to further enhance the discrimination between speakers 1, 2 and further reduce the dimensionality of a speaker profile. The procedure can be extended to multiple dimensions and to multiple speakers. Finally, the optimal linear discriminants (e.g. projections 1510) for all the training speakers evaluated by trained neural network 1400 can be determined and stored. The corresponding transformations can be applied subsequently (at run-time) to derive voice profiles 1447 from activations of layer 1445, for an arbitrary speaker. Thus, voice profile 1447 can be a shorter vector than a feature vector extracted from layer 1445.

4. Voice Profile Comparison

In some examples, a current voice profile (e.g. determined at block 1320) can be compared with a voice profile retrieved from storage (e.g. at block 1350) using a probabilistic linear discriminant analysis (PLDA) technique. A score obtained with PLDA can indicate a margin between (a) a probability that a current voice profile belongs to a purported speaker and (b) a probability that the current voice profile belongs to a different speaker. The PLDA score can be linearly calibrated to obtain a likelihood ratio. The linear calibration can be determined using a logistic regression model on training data.

Numerous variations and extensions of the disclosed techniques can be implemented within the scope of this disclosure. For example, at process blocks 1340, 1350, the stored or retrieved voice profiles can be accompanied by metadata indicating whether the voice profile has been authenticated, or a timestamp indicating a date at which the voice profile was determined. For example, an initial voice profile stored at block 1340 for a purported speaker can be flagged as unverified until either the call recipient or an authentication system has independently corroborated authenticity of the purported speaker. Conversely, the determination at block 1370 can reflect metadata retrieved along with the voice profile. To illustrate, a user can be warned that the reference (retrieved) voice profile is unverified, or that the age of the reference voice profile exceeds a threshold. In FIG. 14, the layer stack, frame concatenation parameters, and time structure can be varied, with corresponding influence in accuracy, latency, or computation required.

Example User Interface

FIGS. 16A-16E are screenshots of an example user interface (UI) implemented on a mobile device such as 409, where the illustrated UI can be implemented by an app such as 480. Similar functionality can be implemented for a call center agent UI such as 584. Similar or additional functionality can be implemented at an administrator console for an authentication service such as 310.

Figure 16C:
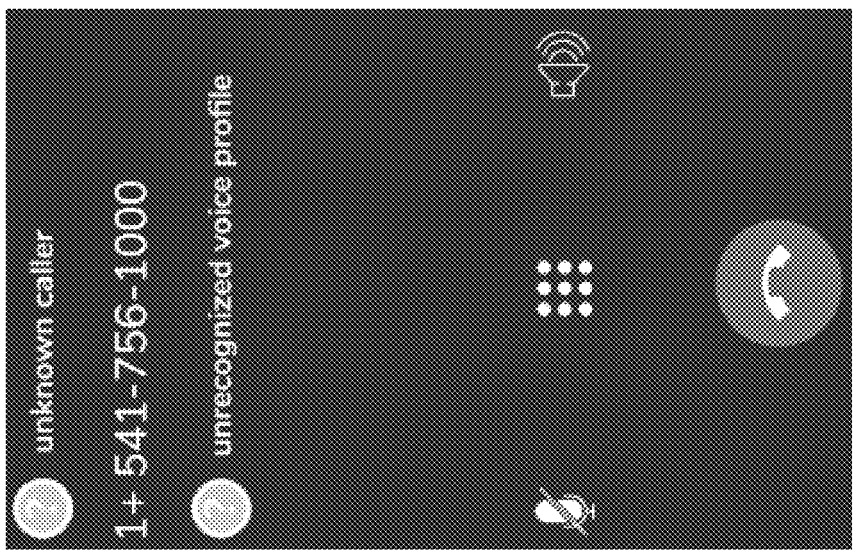
FIGS. 16A-16E are screenshots of an example user interface for the disclosed technologies.
Figure 16B:
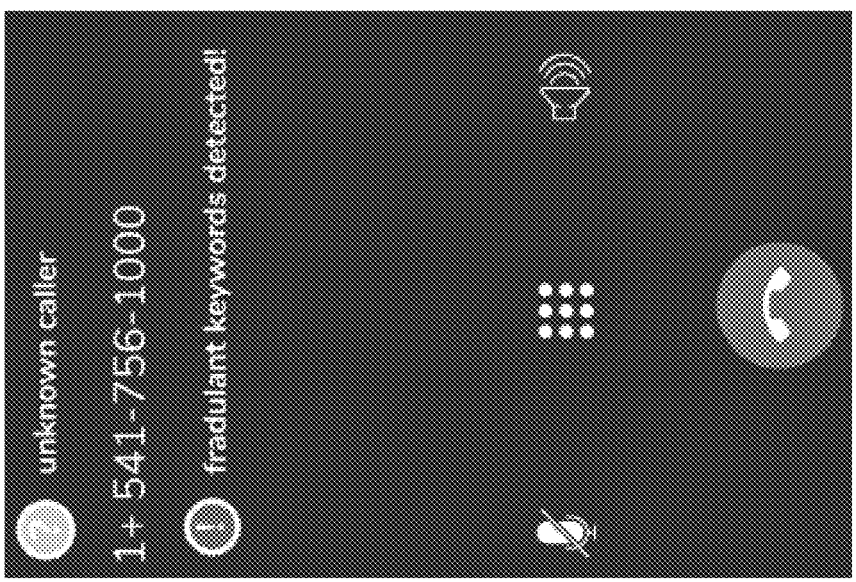
Figure 16A:
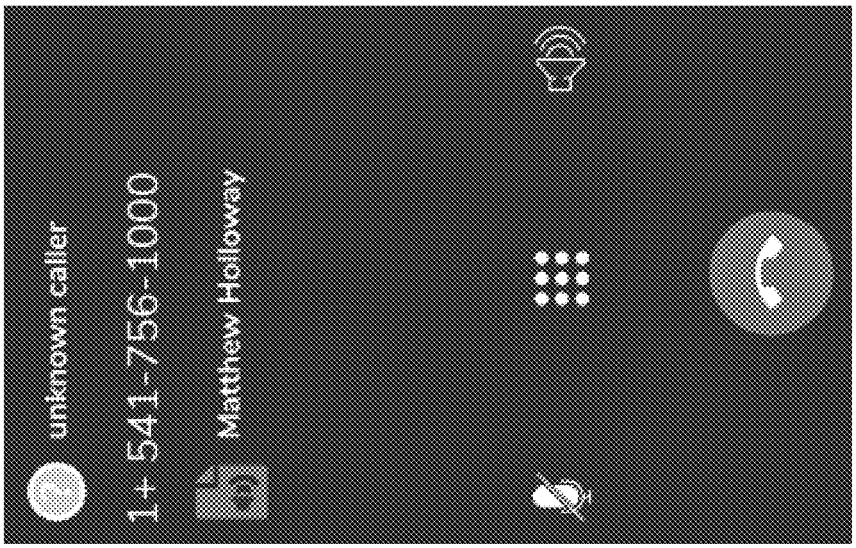

FIG. 16A shows an initial view of a call received from an unknown caller, whose purported phone number and name can be obtained through a caller ID facility over a telephony network such as 403. FIG. 16B shows a view after a vishing content monitor (similar to content detector 350) has determined that the likelihood of a vishing threat is above a threshold. An annunciator message on the device display indicates that "fraudulent keywords [have been] detected!".

FIG. 16C shows a rejection from a voice profile monitor, with an annunciator on the device display indicating "unrecognized voice profile." In some examples, such a message can be issued from a block such as 1330, indicating that a voice profile database (similar to 365) does not have a stored profile for the purported speaker Matthew Holloway. In other examples, although the purported speaker is unknown locally on the mobile device, a profile of the purported speaker can be available at a remote authentication service (similar to 410), and the message of FIG. 16C can result from a block such as 1380, indicating that a voice profile of the current speaker is not recognized as matching the profile of the purported speaker.

Figure 16D:
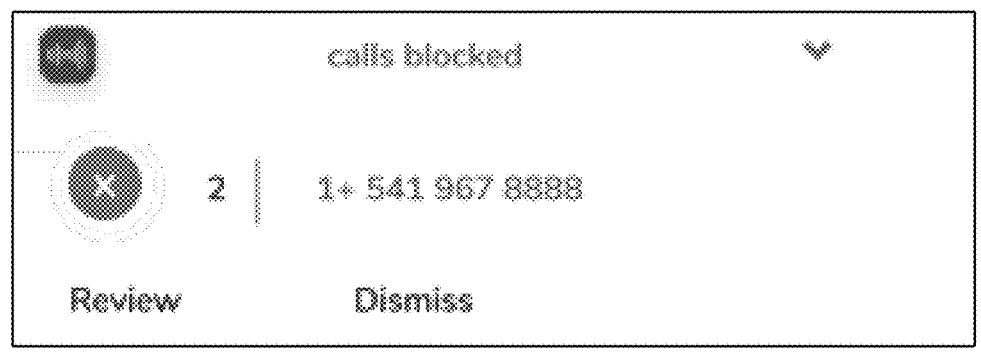

FIG. 16D illustrates a status report from an app such as 480. In the illustration, two calls have been blocked. That is, authentication service 410 can learn phone numbers or other subscriber identifiers from which vishing calls are known to have originated, and can blacklist these numbers. In some examples, the blacklist can be shared among multiple subscribers to service 410, so that a detected vishing call to a first subscriber can result in a warning or a blocked call when the same caller attempts to reach a second subscriber.

Figure 16E:
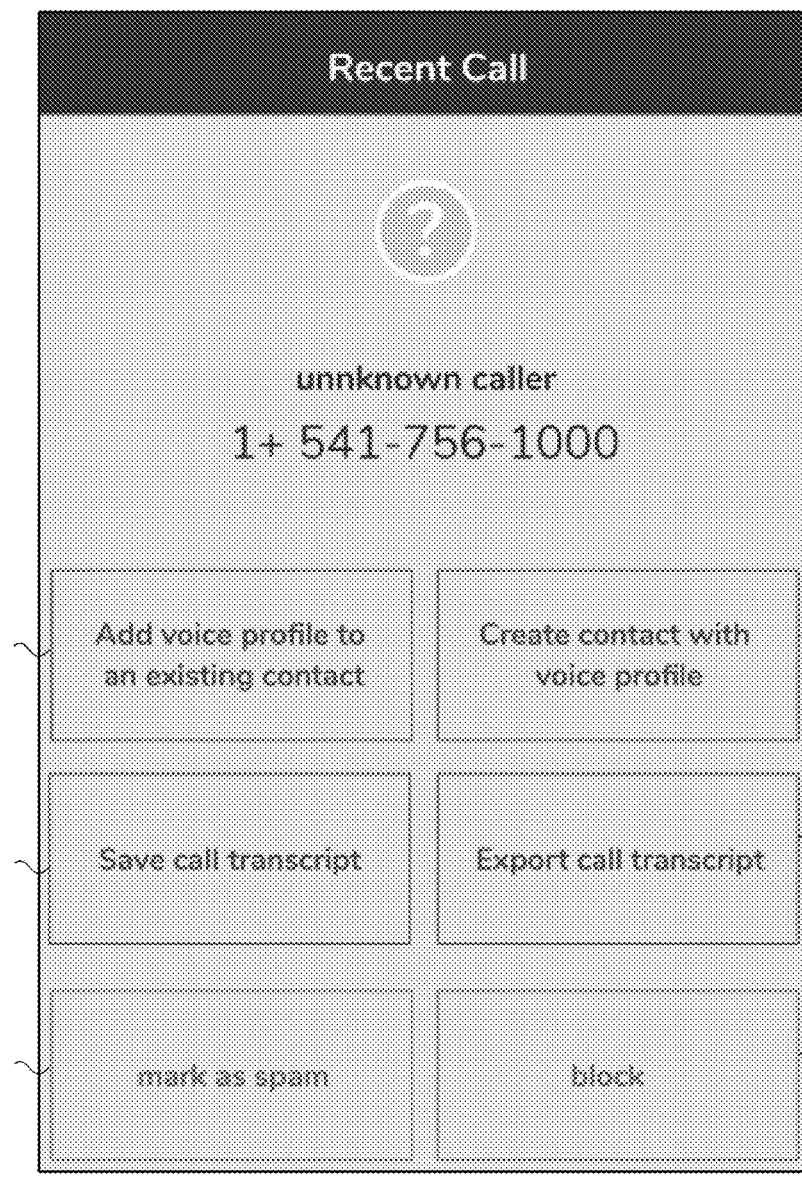

FIG. 16E illustrates a configuration page for an app such as 480. Responsive to a recent call (in this illustration, a call from an unknown caller), a call recipient (e.g. a mobile device user) can be offered a menu screen as illustrated. In the illustration, the user can vouch for the legitimacy of the call by selecting buttons 1651 or 1652, whereby the caller's voice profile can be added to a profile database, to be used for comparison on subsequent calls with the same caller. As indicated, button 1652 can be used for a new contact, while button 1651 can be used to add the recent caller's profile to an existing contact. An authentication service such as 410 can provide value-added services beyond vishing detection. A transcript of the recent call can be stored or exported by selection of buttons 1653, 1654 respectively. In varying examples, the transcript can be stored locally on a mobile device, at the associated authentication service, at another configured remote storage location, or can be exported as a file or via email. Button 1655, when selected, activates a facility to mark the recent call as spam, to blacklist the caller either locally or at the authentication service. Button 1656 allows a user to block the recent caller, so that future calls with a same subscriber identifier are not connected to the instant mobile device or to the instant user.

Example Performance Results

Examples of the disclosed technologies have been trained and tested with a range of publicly available datasets ranging in size from about 100 to about 1,000,000 samples of both legitimate and vishing calls. As one measure, an equal-error rate (EER) was determined with the detectors tuned so that the probability of false positives (vishing threat detected when there was none) equals the probability of false negatives (vishing threat present but not detected).

In tests, a disclosed spoofing detector was found to have EER=12% with only 3 seconds of voice sample to analyze, and an EER below 2.5% with 20 seconds of voice sample. A tampering detector was able to detect splicing with an EER of about 3%. Other tests of a tampering detector were even more accurate. Detection of speech synthesized voices (e.g. for impersonating a purported caller) achieved EER about 0.01% on new (synthesized) voice samples not present in training data.

A Generalized Computer Environment

Figure 17:
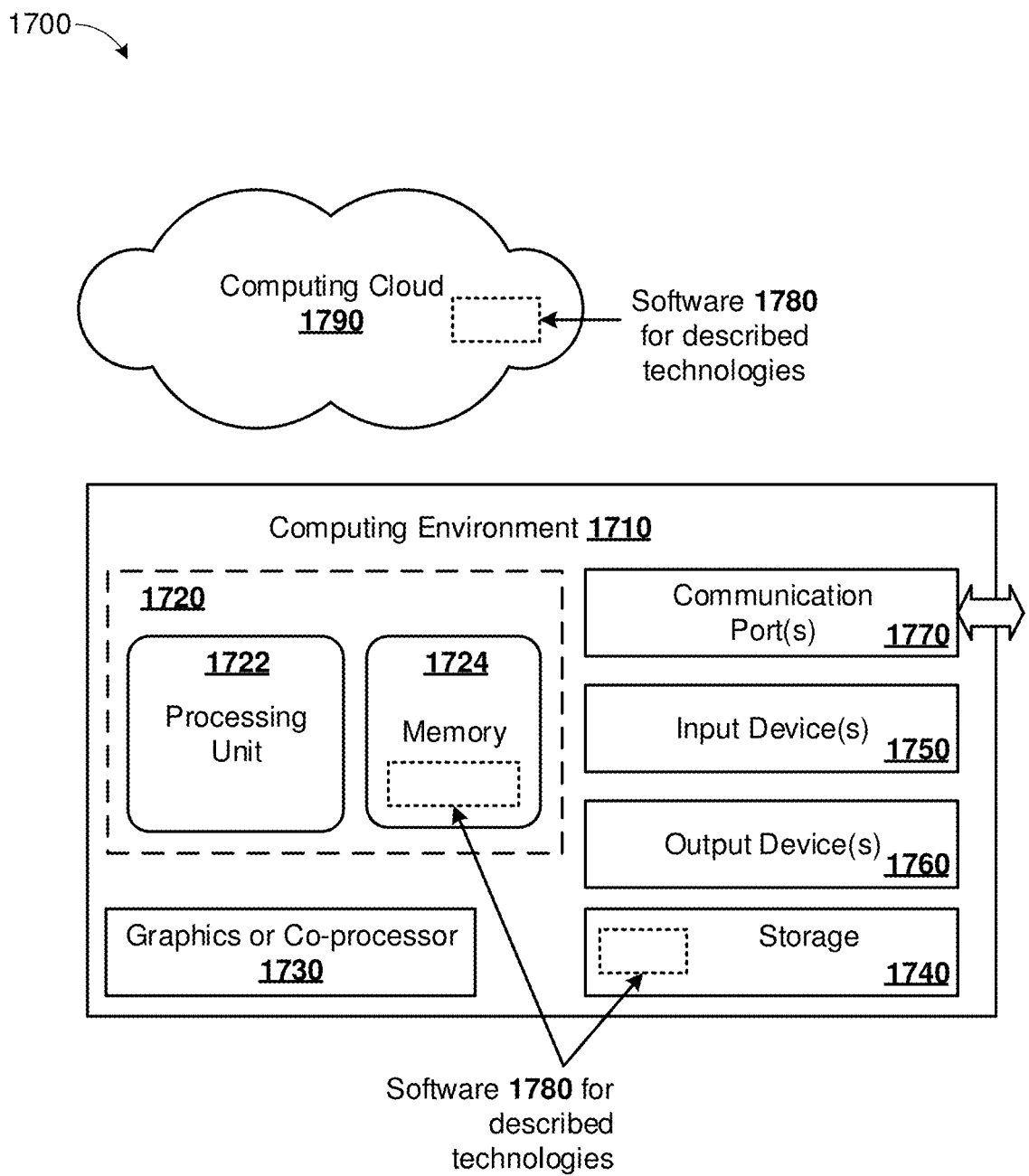
FIG. 17 is a diagram schematically depicting a computing environment suitable for implementation of disclosed technologies.

FIG. 17 illustrates a generalized example of a suitable computing system 1700 in which described examples, techniques, and technologies, including configuration, deployment, or operation, of a vishing detector, can be implemented. The computing system 1700 is not intended to suggest any limitation as to scope of use or functionality of the present disclosure, as the innovations can be implemented in diverse general-purpose or special-purpose computing systems.

With reference to FIG. 17, computing environment 1710 includes one or more processing units 1722 and memory 1724. In FIG. 17, this basic configuration 1720 is included within a dashed line. Processing unit 1722 executes computer-executable instructions, such as for implementing components of a software architecture for vishing detection (e.g., components shown in FIG. 3, 8, 12, 14), any of the methods described herein (e.g., illustrated in context of FIGS. 1-2, 6-7, 9, 11, 13), or various other architectures, components, data structures, handlers, managers, or modules described herein. Processing unit 1722 can be a general-purpose central processing unit (CPU), a processor in an application-specific integrated circuit (ASIC), or any other type of hardware or virtual processor. In a multi-processing system, multiple processing units execute computer-executable instructions to increase processing power. Computing environment 1710 can also include a graphics processing unit or co-processing unit 1730. Tangible memory 1724 can be volatile memory (e.g., registers, cache, or RAM), non-volatile memory (e.g., ROM, EEPROM, or flash memory), or some combination thereof, accessible by processing units 1722, 1730. The memory 1724 stores software 1780 implementing one or more innovations described herein, in the form of computer-executable instructions suitable for execution by the processing unit(s) 1722, 1730.

A computing system 1710 can have additional features, such as one or more of storage 1740 (representing e.g. storage for executable instructions, configuration or state information of a vishing detector), input devices 1750, output devices 1760, or communication ports 1770. An interconnection mechanism (not shown) such as a bus, controller, or network interconnects the components of the computing environment 1710. In some examples, operating system software (not shown) provides an operating environment for other software executing in the computing environment 1710, and coordinates activities of the components of the computing environment 1710.

The memory 1724 or storage 1740 can also store acquired or calculated data, including measurements, readings, or statistics of a vishing detector. The memory 1724 or storage 1740 can also store some or all of a configuration file, an auxiliary input file, and/or other configuration and operational data. The tangible storage 1740 can be removable or non-removable, and includes flash memory, magnetic disks, magnetic tapes or cassettes, CD-ROMs, DVDs, or any other medium which can be used to store information in a non-transitory way and which can be accessed within the computing environment 1710. The storage 1740 stores instructions of the software 1780 (including instructions and/or data) implementing one or more innovations described herein.

The input device(s) 1750 can be a mechanical, touch-sensing, or proximity-sensing input device such as a push-button, keypad, keyboard, mouse, pen, touchscreen, or trackball, a voice input device, a scanning device, or another device that provides input to the computing environment 1710. The output device(s) 1760 can be a display, indicator lamp, printer, speaker, optical disk writer, or another device that provides output from the computing environment 1710.

The communication port(s) 1770 enable communication over a communication medium to another computing entity. The communication medium conveys information such as computer-executable instructions, voice signals, audio or video input or output, readings, alerts, notifications, or other data in a modulated data signal. A modulated data signal is a signal that has one or more of its characteristics set or changed in such a manner as to encode information in the signal. By way of example, and not limitation, communication media can use an electrical, optical, RF, acoustic, or other carrier.

In some examples, computer system 1700 can also include a computing cloud 1790 in which instructions implementing all or a portion of the disclosed technology can be executed. Any combination of memory 1724, storage 1740, and computing cloud 1790 can be used to store software instructions and data of the disclosed technologies. A local or datacenter computing environment 1710 can utilize the computing cloud 1790 to obtain computing services and perform computing operations (e.g., data processing, data storage, and the like).

In some examples, software embodiments of the disclosed technologies can be deployed on a smartphone, tablet, portable or fixed computer, television set, memory card, memory stick, or a handheld remote control device.

The present innovations can be described in the general context of computer-executable instructions, such as those included in program modules, being executed in a computing system on a target real or virtual processor. Generally, program modules or components include routines, programs, libraries, objects, classes, components, data structures, etc. that perform particular tasks or implement particular data types. The functionality of the program modules can be combined or split between program modules as desired in various embodiments. Computer-executable instructions for program modules can be executed within a local or distributed computing system.

The terms "computing system", "computing environment", and "computing device" are used interchangeably herein. Unless the context clearly indicates otherwise, neither term implies any limitation on a type of computing system, computing environment, or computing device. In general, a computing system, computing environment, or computing device can be local or distributed, and can include any combination of special-purpose hardware and/or general-purpose hardware and/or virtualized hardware, together with software implementing the functionality described herein. Virtual processors, virtual hardware, and virtualized devices are ultimately embodied in one or another form of physical computer hardware.

Example Cloud Computing Environment

Figure 18:
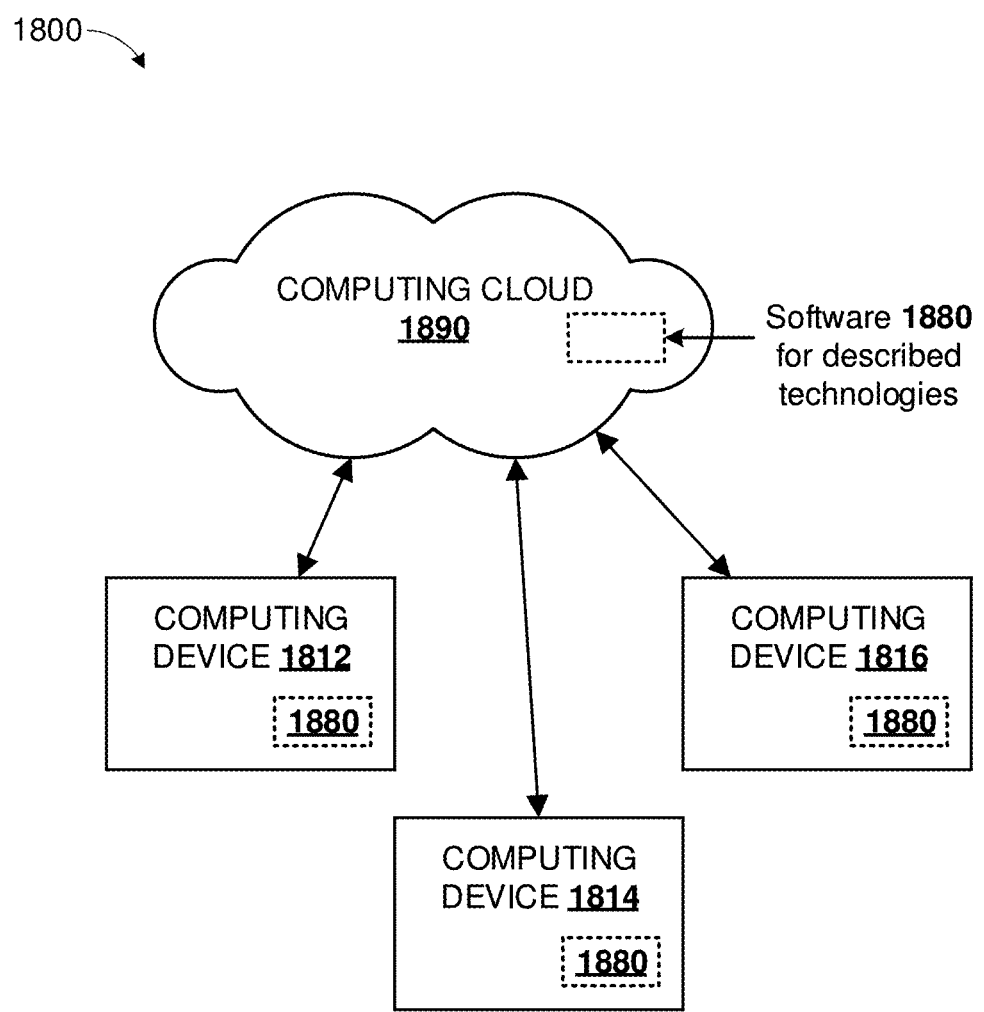
FIG. 18 is a diagram schematically depicting computing devices operating in conjunction with a computing cloud for implementation of disclosed technologies.

FIG. 18 depicts an example cloud computing environment 1800 in which the described technologies can be implemented. The cloud computing environment 1800 comprises a computing cloud 1890 containing resources and providing services. The computing cloud 1890 can comprise various types of cloud computing resources, such as computer servers, data storage repositories, networking resources, and so forth. The computing cloud 1890 can be centrally located (e.g., provided by a data center of a business or organization) or distributed (e.g., provided by various computing resources located at different locations, such as different data centers and/or located in different cities or countries). Particularly, a cloud computing server supporting a mobile client can be migrated as the mobile client moves during a communication session.

The computing cloud 1890 can be operatively connected to various types of computing devices (e.g., client computing devices), such as computing devices 1812, 1814, and 1816, and can provide a range of computing services thereto. One or more of computing devices 1812, 1814, and 1816 can be computers (e.g., servers, virtual machines, embedded systems, desktop, or laptop computers), mobile devices (e.g., tablet computers, smartphones, or wearable appliances), or other types of computing devices. Communication links between computing cloud 1890 and computing devices 1812, 1814, and 1816 can be over wired, wireless, or optical links, or any combination thereof, and can be short-lived or long-lasting. Communication links can be continuous or sporadic. These communication links can be stationary or can move over time, being implemented over varying paths and having varying attachment points at each end. Computing devices 1812, 1814, and 1816 can also be connected to each other.

Computing devices 1812, 1814, and 1816 can utilize the computing cloud 1890 to obtain computing services and perform computing operations (e.g., data processing, data storage, and the like). Particularly, software 1880 for performing the described innovative technologies can be resident or executed in the computing cloud 1890, in computing devices 1812, 1814, and 1816, or in a distributed combination of cloud and computing devices.

General Considerations

As used in this disclosure, the singular forms "a", "an", and "the" include the plural forms unless the context clearly dictates otherwise. Additionally, the terms "includes" and "incorporates" mean "comprises". Further, the term "coupled" encompasses mechanical, electrical, magnetic, optical, wireless, as well as other practical ways of coupling or linking items together, and does not exclude the presence of intermediate elements between the coupled items. Furthermore, as used herein, the terms "or" or "and/or" mean any one item or combination of items in the phrase.

The systems, methods, and apparatus described herein should not be construed as being limiting in any way. Instead, this disclosure is directed toward all novel and nonobvious features and aspects of the various disclosed embodiments, alone and in various combinations and subcombinations with one another. The disclosed systems, methods, and apparatus are not limited to any specific aspect or feature or combinations thereof, nor do the disclosed things and methods require that any one or more specific advantages be present or problems be solved. Furthermore, any features or aspects of the disclosed embodiments can be used in various combinations and subcombinations with one another.

Although the operations of some of the disclosed methods are described in a particular, sequential order for convenient presentation, it should be understood that this manner of description encompasses rearrangement, unless a particular ordering is required by specific language set forth below. For example, operations described sequentially can in some cases be rearranged or performed concurrently. Moreover, for the sake of simplicity, the attached figures may not show the various ways in which the disclosed things and methods can be used in conjunction with other things and methods. Additionally, the description sometimes uses terms like "access," "acquire," "aggregate," "align," "analyze," "apply," "augment," "authenticate," "average," "calculate," "calibrate," "classify," "compare," "compute," "concatenate," "construct," "convert," "decode," "delay," "detect," "determine," "digitize," "discard," "display," "downsample," "encode," "evaluate," "execute," "extract," "filter," "forward," "generate," "identify," "indicate," "input," "incorporate," "iterate," "learn," "measure," "make," "notify," "obtain," "output," "process," "provide," "prune," "receive," "record," "repeat," "resample," "reset," "retain," "retrieve," "run," "scale," "segment," "select," "source," "splice," "spoof," "store," "stream," "tamper," "train," "transfer," "transform," "transmit," "upsample," "use," "validate," "verify," and "weight" to indicate computer operations in a computer system. These terms denote actual operations that are performed by or managed by a computer. The actual operations that correspond to these terms will vary depending on the particular implementation and are readily discernible by one of ordinary skill in the art.

Theories of operation, scientific principles, or other theoretical descriptions presented herein in reference to the apparatus or methods of this disclosure have been provided for the purposes of better understanding and are not intended to be limiting in scope. The apparatus and methods in the appended claims are not limited to those apparatus and methods that function in the manner described by such theories of operation.

Any of the disclosed methods can be implemented as computer-executable instructions or a computer program product stored on one or more computer-readable storage media, such as tangible, non-transitory computer-readable storage media, and executed on a computing device (e.g., any available computing device, including tablets, smartphones, or other mobile devices that include computing hardware). Tangible computer-readable storage media are any available tangible media that can be accessed within a computing environment (e.g., one or more optical media discs such as DVD or CD, volatile memory components (such as DRAM or SRAM), or nonvolatile memory components (such as flash memory or hard drives)). By way of example, and with reference to FIG. 17, computer-readable storage media include memory 1724, and storage 1740. The terms computer-readable storage media, computer-readable media, or non-volatile storage do not include signals and carrier waves. In addition, the terms computer-readable storage media, computer-readable media, or non-volatile storage do not include communication ports (e.g., 1770) or communication media.

Any of the computer-executable instructions for implementing the disclosed techniques as well as any data created and used during implementation of the disclosed embodiments can be stored on one or more computer-readable storage media. The computer-executable instructions can be part of, for example, a dedicated software application or a software application that is accessed or downloaded via a web browser or other software application (such as a remote computing application). Such software can be executed, for example, on a single local computer (e.g., any suitable commercially available computer) or in a network environment (e.g., via the Internet, a wide-area network, a local-area network, a client-server network, a cloud computing network, or other such network) using one or more network computers.

For clarity, only certain selected aspects of the software-based implementations are described. Other details that are well known in the art are omitted. For example, it should be understood that the disclosed technology is not limited to any specific computer language or program. For instance, the disclosed technology can be implemented by software written in Adobe Flash, assembly language, B #, C, C++, C #, Curl, Dart, Fortran, Haskell, Java, JavaScript, Julia, Lisp, Matlab, Octave, Perl, Python, R, Ruby, Rust, SAS, SPSS, SQL, WebAssembly, any derivatives thereof, or any other suitable programming language, or, in some examples, markup languages such as HTML or XML, using CSS, JSON, or any combination of suitable languages, libraries, packages, or scripts. Likewise, the disclosed technology is not limited to any particular computer or type of hardware. Certain details of suitable computers and hardware are well known and need not be set forth in detail in this disclosure.

Furthermore, any of the software-based embodiments (comprising, for example, computer-executable instructions for causing a computer to perform any of the disclosed methods) can be uploaded, downloaded, or remotely accessed through a suitable communication means. Such suitable communication means include, for example, the Internet, the World Wide Web, an intranet, software applications, cable (including fiber optic cable), magnetic communications, electromagnetic communications (including RF, microwave, infrared, and optical communications), electronic communications, or other such communication means.

The disclosed methods, apparatus, and systems should not be construed as limiting in any way. Instead, the present disclosure is directed toward all novel and nonobvious features and aspects of the various disclosed embodiments, alone and in various combinations and subcombinations with one another. The disclosed methods, apparatus, and systems are not limited to any specific aspect or feature or combination thereof, nor do the disclosed embodiments require that any one or more specific advantages be present or problems be solved. The technologies from any example can be combined with the technologies described in any one or more of the other examples.

In view of the many possible embodiments to which the principles of the disclosed invention may be applied, it should be recognized that the illustrated embodiments are only preferred examples of the invention and should not be taken as limiting the scope of the invention. Rather, the scope of the invention is defined by the following claims. We therefore claim as our invention all that comes within the scope and spirit of these claims.

We claim:

1. A system comprising:
   one or more hardware processors, with memory coupled thereto and one or more network interfaces;
   computer-readable media storing instructions that, when executed by the one or more hardware processors, implement an authentication service, the stored instructions comprising:
   first instructions that, when executed, cause the authentication service to receive voice signals being delivered to a recipient;
   second instructions that, when executed, cause features of the received voice signals to be conveyed to a plurality of vishing detectors, and respective scores to be received from the vishing detectors;
   third instructions that, when executed, cause the authentication service to transmit a real-time notification of a vishing threat based on the received scores;
   fourth instructions that, when executed, implement a first one of the vishing detectors configured to:
   first analyze the received voice signals for tampering, by evaluating deep scattering spectra (DSS) features and shifted delta cepstra (SDC) features of a first voice signal among the received voice signals, to determine a measure of likelihood that the first voice signal has been tampered with; and
   generate a first score of the scores based on the first analyzing; measure of likelihood; and
   one or more of fifth and sixth instructions, wherein:
   the fifth instructions, when executed, implement a second one of the vishing detectors configured to second analyze the received voice signals for content associated with vishing, and to generate a second score of the scores based on the second analyzing; and
   the sixth instructions, when executed, implement a third one of the vishing detectors configured to compare a voice profile of the received voice signals with a stored voice profile of a purported speaker of the received voice signals, and to generate a third score of the scores based on the comparing.

2. The system of claim 1, wherein the stored instructions include the sixth instructions, and the purported speaker is identified based on an identifier associated with a purported origin of the received voice signals.

3. The system of claim 1, further comprising: a software application running on a telephony device of the recipient and configured to generate an audible, visual, or haptic indication of the notification to the recipient.

4. The system of claim 3, wherein the indication of the notification can have varying manifestation according to a type, likelihood, or estimated severity of the vishing threat.

5. The system of claim 3, wherein the telephony device is a mobile phone.

6. The system of claim 3, wherein the recipient is a call center agent.

7. The system of claim 1, wherein the evaluating SDC features comprises determining the SDC features by mel frequency analysis of the first voice signal.

8. The system of claim 7, wherein the fourth instructions are configured to implement the mel frequency analysis by:
   calculating mel frequency cepstral coefficients (MFCCs) of the first voice signal for a succession of time windows; and
   determining the SDC features from differences of the MFCCs between respective pairs of the time windows.

9. The system of claim 1, wherein the evaluating DSS features and SDC features comprises:
   constructing a feature vector based on the DSS features and the SDC features;
   determining a first posterior probability of tampering from a first Gaussian mixture model (GMM) trained on first training data derived from tampered voice signals;
   determining a second posterior probability of non-tampering from a second Gaussian mixture model (GMM) trained on second training data derived from non-tampered voice signals; and
   determining the measure of likelihood based on a ratio of the first and second posterior probabilities.

10. The system of claim 1, wherein the evaluating DSS features provides detection of voice conversion or speech synthesis, and the evaluating SDC features provides detection of splicing.

11. The system of claim 1, wherein the received voice signals comprise a second voice signal, the measure of likelihood is a first measure of likelihood, and the stored instructions include the fifth instructions which, when executed, cause:
   extraction of a most likely sequence of words from the second voice signal; and input of the most likely sequence of words to a trained machine learning classifier to determine a second measure of likelihood that the most likely sequence of words contains the content associated with vishing; and wherein the second score is dependent on the second measure of likelihood.

12. The system of claim 1, wherein:

the measure of likelihood is a first measure of likelihood;

the stored instructions include the fifth and sixth instructions;

the second and third scores are determined based on respective second and third measures of likelihood; and the real-time notification is dependent on a comparison of a given one of the first, second, or third measures of likelihood with a respective predetermined threshold.

13. The system of claim 1, wherein the evaluating DSS features comprises calculating first-level and second-level wavelet scattering components.

14. One or more non-transitory computer-readable media storing instructions that, when executed by the one or more hardware processors, implement an authentication service, the stored instructions comprising:

first instructions that, when executed, cause the authentication service to receive voice signals being delivered to a recipient;

second instructions that, when executed, cause features of the received voice signals to be conveyed to a plurality of vishing detectors, and respective scores to be received from the vishing detectors;

third instructions that, when executed, cause the authentication service to transmit a real-time notification of a vishing threat based on the received scores;

fourth instructions that, when executed, implement a first one of the vishing detectors configured to:

first analyze the received voice signals for tampering, by evaluating deep scattering spectra (DSS) features and shifted delta cepstra (SDC) features of a first voice signal among the received voice signals, to determine a measure of likelihood that the first voice signal has been tampered with; and generate a first score of the scores based on the measure of likelihood; and one or more of fifth and sixth instructions, wherein:

the fifth instructions, when executed, implement a second one of the vishing detectors configured to second analyze the received voice signals for content associated with vishing, and to generate a second score of the scores based on the second analyzing; and the sixth instructions, when executed, implement a third one of the vishing detectors configured to compare a voice profile of the received voice signals with a stored voice profile of a purported speaker of the received voice signals, and to generate a third score of the scores based on the comparing.

15. The one or more non-transitory computer-readable media of claim 14, wherein the evaluating DSS features comprises wavelet analysis, and the fourth instructions are configured to implement the wavelet analysis by:

inputting the first voice signal to a multi-octave first level wavelet filter bank to obtain first level scattering components;

inputting the first level scattering components to a multi-octave second level wavelet filter bank to obtain second level scattering components; and determining the DSS features from the first and second level scattering components.

16. The one or more non-transitory computer-readable media of claim 14, wherein the stored instructions further comprise: a software application configured to run on a telephony device of the recipient and configured to generate an audible, visual, or haptic indication of the notification to the recipient.

17. The one or more non-transitory computer-readable media of claim 13, wherein the telephony device is a mobile phone.

18. The one or more non-transitory computer-readable media of claim 13, wherein the recipient is a call center agent.

19. The one or more non-transitory computer-readable media of claim 14, wherein the evaluating SDC features comprises determining the SDC features by mel frequency analysis of the first voice signal.

20. The one or more non-transitory computer-readable media of claim 19, wherein the fourth instructions are configured to implement the mel frequency analysis by:

calculating mel frequency cepstral coefficients (MFCCs) of the first voice signal for a succession of time windows; and determining the SDC features from differences of the MFCCs between respective pairs of the time windows.

21. The one or more non-transitory computer-readable media of claim 14, wherein the evaluating DSS features and SDC features comprises:

constructing a feature vector based on the DSS features and the SDC features;

determining a first posterior probability of tampering from a first Gaussian mixture model (GMM) trained on first training data derived from tampered voice signals;

determining a second posterior probability of non-tampering from a second Gaussian mixture model (GMM) trained on second training data derived from non-tampered voice signals; and determining the measure of likelihood based on a ratio of the first and second posterior probabilities.

22. The one or more non-transitory computer-readable media of claim 14, wherein the received voice signals comprise a second voice signal, the measure of likelihood is a first measure of likelihood, and the stored instructions include the fifth instructions which, when executed, cause:

extraction of a most likely sequence of words from the second voice signal; and input of the most likely sequence of words to a trained machine learning classifier to determine a second measure of likelihood that the most likely sequence of words contains the content associated with vishing; and wherein the second score is dependent on the second measure of likelihood.

23. The one or more non-transitory computer-readable media of claim 22, wherein the trained machine learning classifier is trained using a training dataset comprising first word patterns from recorded vishing communications and second word patterns from recorded legitimate communications.

24. The one or more non-transitory computer-readable media of claim 22, wherein the fifth instructions are configured to implement the extraction by:

inputting the second voice signal to a neural network to obtain senone posterior probabilities; and inputting the senone posterior probabilities to a speech decoder to determine the most likely sequence of words.

25. The one or more non-transitory computer-readable media of claim 24, wherein the neural network is a time-delay neural network (TDNN) implementing a hybrid acoustic model comprising a deep neural network (DNN) and a hidden Markov model (HMM).

26. The one or more non-transitory computer-readable media of claim 24, wherein the speech decoder incorporates a weighted finite state transducer (WFST) and generates a lattice of alternative word sequences including a path that is the most likely sequence of words.

27. The one or more non-transitory computer-readable media of claim 14, wherein:
the measure of likelihood is a first measure of likelihood;
the stored instructions include the fifth and sixth instructions;
the second and third scores are determined based on respective second and third measures of likelihood; and
the real-time notification is dependent on a comparison of a given one of the first, second, or third measures of likelihood with a respective predetermined threshold.

28. A computer-implemented method comprising, at an authentication service:
receiving voice signals being delivered to a recipient;
conveying features of the received voice signals to a plurality of vishing detectors;
by a first one of the vishing detectors:
analyzing the received voice signals for tampering, by evaluating deep scattering spectra (DSS) features and shifted delta cepstra (SDC) features of a first voice signal among the received voice signals, to determine a measure of likelihood that the first voice signal has been tampered with; and
generating a first score based on the measure of likelihood;
by a second one of the vishing detectors, generating a second score based on:
analyzing the received voice signals for content associated with vishing, to generate a second score of the scores; or
comparing a voice profile of the received voice signals with a stored voice profile of a purported speaker of the received voice signals;
receiving respective scores from the vishing detectors; and
transmitting a real-time notification of a vishing threat based on the received first and/or second score.

29. The computer-implemented method of claim 28, wherein the evaluating SDC features comprises determining the SDC features by mel frequency analysis of the first voice signal.

30. The computer-implemented method of claim 29, wherein the first vishing detector implements the mel frequency analysis by:
calculating mel frequency cepstral coefficients (MFCCs) of the first voice signal for a succession of time windows; and
determining the SDC features from differences of the MFCCs between respective pairs of the time windows.

31. The computer-implemented method of claim 28, wherein the evaluating DSS features and SDC features comprises:
constructing a feature vector based on the DSS features and the SDC features;
determining a first posterior probability of tampering from a first Gaussian mixture model (GMM) trained on first training data derived from tampered voice signals;
determining a second posterior probability of non-tampering from a second Gaussian mixture model (GMM) trained on second training data derived from non-tampered voice signals; and
determining the measure of likelihood based on a ratio of the first and second posterior probabilities.

32. The computer-implemented method of claim 28, wherein the evaluating DSS features provides detection of voice conversion or speech synthesis, and the evaluating SDC features provides detection of splicing.

33. The computer-implemented method of claim 28, wherein the received voice signals comprise a second voice signal, the measure of likelihood is a first measure of likelihood, and the second vishing detector analyzes the received voice signals for content by:
extracting a most likely sequence of words from the second voice signal; and
inputting the most likely sequence of words to a trained machine learning classifier to determine a second measure of likelihood that the most likely sequence of words contains the content associated with vishing; and
wherein the second score is dependent on the second measure of likelihood.

34. The computer-implemented method of claim 28, wherein:
the measure of likelihood is a first measure of likelihood;
the second vishing detector analyzes the received voice signals for content to determine a second measure of likelihood;
the second vishing detector compares the voice profile of the received voice signals with the stored voice profile to determine a third measure of likelihood;
the second score is based on the second and/or third measures of likelihood; and
the real-time notification is dependent on a comparison of a given one of the first, second, or third measures of likelihood with a respective predetermined threshold.

35. The computer-implemented method of claim 28, wherein the evaluating DSS features comprises calculating first-level and second-level wavelet scattering components.

* * * * *